(12) United States Patent
Kulkarni et al.

(10) Patent No.: US 10,613,903 B1
(45) Date of Patent: *Apr. 7, 2020

(54) STREAM PROCESSING AT SCALE

(71) Applicant: Twitter, Inc., San Francisco, CA (US)

(72) Inventors: Sanjeev Raghavendra Kulkarni, Los Altos, CA (US); Nikunj Bhagat, San Francisco, CA (US); Maosong Fu, San Francisco, CA (US); Vikas Kedigehalli, San Francisco, CA (US); Christopher Kellogg, San Francisco, CA (US); Sailesh Mittal, San Francisco, CA (US); Jignesh M. Patel, Madison, WI (US); Karthik Ramasamy, San Francisco, CA (US); Siddharth Taneja, Sunnyvale, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,385

(22) Filed: Oct. 8, 2018

Related U.S. Application Data

(63) Continuation of application No. 15/069,893, filed on Mar. 14, 2016, now Pat. No. 10,095,547.

(Continued)

(51) Int. Cl.
*G06F 9/455* (2018.01)
*G06F 9/50* (2006.01)
*G06F 16/2455* (2019.01)

(52) U.S. Cl.
CPC ............ *G06F 9/5011* (2013.01); *G06F 9/455* (2013.01); *G06F 16/24568* (2019.01)

(58) Field of Classification Search
CPC ...... G06F 9/544; G06F 11/07; G06F 11/1438; G06F 17/30516; G06F 17/30545;
(Continued)

(56) References Cited

U.S. PATENT DOCUMENTS 8,286,191 B2 10/2012 Amini et al.
9,015,238 B1 * 4/2015 Anton .................. G06F 16/256
709/203

(Continued)

OTHER PUBLICATIONS

"A working guide to kestrel," retrieved from https://twitter.github.io/kestrel/docs/guide.html on Jun. 10, 2016, 11 pp.

(Continued)

*Primary Examiner* — Dong U Kim
(74) *Attorney, Agent, or Firm* — Smith Baluch LLP

(57) ABSTRACT

A system and method for data stream processing. Two or more instances are connected as a topology, wherein at least one of the instances is a spout and at least one of the instances is a bolt. The topology is submitted to a scheduler, wherein the service scheduler receives resource offers from a cluster manager representing computing resources available on one or more of cluster nodes and determines resources to accept and computations to run on the accepted computing resources. The topology is scheduled as one or more jobs, wherein each job includes two or more containers, including a first container and a second container, the first container including a topology master and the second container including a stream manager and one or more stream processing system (SPS) instances, wherein each SPS instance represents one of the instances in the topology.

16 Claims, 14 Drawing Sheets

Related U.S. Application Data

(60) Provisional application No. 62/169,503, filed on Jun. 1, 2015, provisional application No. 62/133,217, filed on Mar. 13, 2015.

(58) Field of Classification Search
CPC ........ G06F 3/067; G06F 9/466; G06F 9/5061; G06F 9/5066
See application file for complete search history.

(56) References Cited

U.S. PATENT DOCUMENTS

| | | | |
|---|---|---|---|
| 9,276,959 B2 | 3/2016 | Theimer et al. | |
| 9,471,585 B1* | 10/2016 | Theimer | G06F 3/0641 |
| 10,095,547 B1 | 10/2018 | Kulkarni et al. | |
| 2009/0300615 A1* | 12/2009 | Andrade | G06F 9/5066 718/100 |
| 2009/0313614 A1* | 12/2009 | Andrade | G06F 8/451 717/151 |
| 2010/0293301 A1* | 11/2010 | Amini | G06F 9/544 710/12 |
| 2010/0293532 A1* | 11/2010 | Andrade | G06F 11/1438 717/140 |
| 2010/0293535 A1* | 11/2010 | Andrade | G06F 8/433 717/156 |
| 2011/0010581 A1* | 1/2011 | Tanttu | G06F 9/5038 714/11 |
| 2012/0331333 A1* | 12/2012 | Imaki | G06F 11/1658 714/2 |
| 2014/0280766 A1* | 9/2014 | Banerjee | H04L 65/60 709/219 |
| 2015/0103837 A1* | 4/2015 | Dutta | H04L 47/125 370/401 |
| 2015/0120224 A1* | 4/2015 | Siebel | G01R 21/00 702/61 |
| 2015/0135255 A1* | 5/2015 | Theimer | H04L 63/20 726/1 |
| 2016/0098662 A1* | 4/2016 | Voss | G06Q 10/06316 705/7.26 |
| 2016/0269247 A1* | 9/2016 | Chakradhar | H04L 67/12 |

OTHER PUBLICATIONS

"S4, distributed stream computing platform," retrieved from http://incubator.apache.org/s4/doc/0.6.0/overview/ on Jun. 10, 2016, 3 pp.

"Samza, Comparison Introduction," retrieved from http://samza.apache.org/learn/documentation/0.7.0/comparisons/introduction.html on Jun. 10, 2016, 4 pp.

"Spark Programming Guide," Spark 1.6.1, retrieved from http://spark.apache.org/docs/latest/programming-guide.html on Jun. 10, 2016, 19 pp.

Akidau et al., "MillWheel: Fault-Tolerant Stream Processing at Internet Scale," Proceedings of the VLDB Endowment, vol. 6, No. 11, Aug. 26-30, 2013, 12 pp.

Ananthanarayanan et al., "Photon: Fault-tolerant and Scalable Joining of Continuous Data Streams," SIGMOD 13, ACM, Jun. 22-27, 2013, pp. 577-588.

Arasu et al., "STREAM: The Stanford Stream Data Manager," IEEE Data Engineering Bulletin, vol. 26, No. 1, Mar. 2003, 8 pp.

Balakrishnan et al., "Retrospective on Aurora," The VLDB Journal, vol. 13, No. 4, Dec. 2004, 17 pp.

Garofalakis et al., "Querying and Mining Data Streams: You Only Get One Look," VLDB 2002, Aug. 20-23, 2002, 125 pp.

Kreps et al., "Kafka: a Distributed Messaging System for Log Processing," NetDB '11, ACM, Jun. 12, 2011, 7 pp.

Kulkarni et al., "Twitter Heron: Stream Processing at Scale," SIGMOD '15, ACM, May 31-Jun. 4, 2015, pp. 239-250.

Loesing et al., "Stormy: An Elastic and Highly Available Streaming Service in the Cloud," DanaC 2012, ACM, Mar. 30, 2012, 6 pp.

Toshniwal et al., "Storm @Twitter," SIGMOD '14, ACM, Jun. 22-27, 2014, pp. 147-156.

Vavilapalli et al., "Apache Hadoop YARN: Yet Another Resource Negotiator," SoCC '13, ACM, Oct. 1-3, 2013, 16 pp.

Prosecution History from U.S. Appl. No. 15/069,893, dated Dec. 7, 2017 through May 17, 2018, 40 pp.

* cited by examiner

STREAM PROCESSING AT SCALE

This application is a continuation of U.S. application Ser. No. 15/069,893 filed Mar. 14, 2016, which claims the benefit of U.S. Provisional Application No. 62/133,217 filed Mar. 13, 2015 and U.S. Provisional Application No. 62/169,503 filed Jun. 1, 2015, the entire contents of each of which are incorporated herein by reference.

BACKGROUND

Data stream processing systems process streams of data, often in real time. In some example stream processing systems, the system provides continuous queries which execute in real time to process particular data streams. In some such example approaches, the stream processing system analyzes data real-time as it arrives, so the user can react to the data as it happens. For instance, a stream processing system may analyze aspects of the data stream to determine real-time trends, real-time conversations, real-time recommendations or real-time search.

SUMMARY

In some examples, a stream processing system includes a cluster manager; a cluster including a plurality of cluster nodes, wherein each cluster node includes computing resources and wherein the cluster nodes are managed by the cluster manager; a service scheduler, wherein the service scheduler receives resource offers from the cluster manager representing computing resources available on one or more of the cluster nodes and determines resources to accept and computations to run on the accepted resources; and a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts, wherein each spout transfers tuples to one or more bolts and wherein each bolt performs a computation on the transferred tuples.

In one example approach, each SPS instance is a Java Virtual Machine (JVM) process executing on one or more of the cluster nodes.

In one example approach, the second container further includes a metrics manager, wherein the stream processing system further comprises a monitoring system, and wherein the metrics manager receives metric information from one or more of the SPS instances and transfers the metric information to the monitoring system.

In one example approach, the second container further includes a metrics manager, wherein the stream processing system further comprises a monitoring system, and wherein the metrics manager receives metric information from the stream manager and from one or more of the SPS instances and transfers the metric information to the monitoring system.

In one example approach, each SPS instance includes a gateway thread and a task execution thread. Each gateway thread controls communication and data movement in and out of the respective SPS instance. Each task execution thread performs a function on data in a data stream received by the gateway thread to arrive at a solution and transfers the solution through the gateway thread to the stream manager and each thread executes as a task on one or more of the cluster nodes.

In one example approach, the gateway thread and the task execution thread use a queue to buffer data transferred from the gateway thread to the task execution thread, and wherein the queue is bounded in size.

In one example approach, the gateway thread and the task execution thread use a queue to buffer data transferred from the gateway thread to the task execution thread, and wherein the queue is reviewed periodically to determine if a size of the queue should be increased or decreased.

In one example approach, the gateway thread and the task execution thread use a queue to buffer data transferred from the task execution thread to the gateway thread, and wherein the queue is reviewed periodically to determine if a size of the queue should be increased or decreased.

In one example approach, the gateway thread and the task execution thread use a queue to buffer metrics data transferred from the task execution thread to the gateway thread, wherein the queue is reviewed periodically to determine if a size of the queue should be increased or decreased.

In one example approach, the stream processing system further comprises a distributed coordination service and a standby topology master, wherein the distributed coordination service stores state information regarding the topology master, wherein the standby topology master replaces the topology master based on the state information.

In one example approach, the stream processing system further comprises a distributed coordination service and a standby topology master, wherein the distributed coordination service stores state information regarding the topology master, wherein, when the topology master fails, the standby topology master replaces the topology master based on the state information, the first container restarts and wherein the topology master in the first container becomes a standby topology master.

In one example approach, when the stream manager in the second container fails, the stream manager is restarted in the second container, the stream manager rediscovers the topology master, and the stream manager retrieves a copy of a physical plan from the topology master.

In one example approach, when one of the SPS instances in the second container fails, the failed SPS instance is restarted in the second container and the restarted SPS instance contacts the stream manager in the second container, retrieves a copy of a physical plan, and executes user code corresponding to the physical plan.

In some examples, a method includes connecting two or more instances as a topology, wherein at least one of the instance is a spout and at least one of the instances is a bolt, wherein each spout transfers tuples to one or more bolts and wherein each bolt performs a computation on the transferred tuples; submitting the topology to a scheduler, wherein the service scheduler receives resource offers from a cluster manager representing computing resources available on one or more of cluster nodes and determines resources to accept and computations to run on the accepted computing resources; scheduling the topology as one or more jobs, wherein each job includes two or more containers, including a first container and a second container, the first container including a topology master and the second container including a stream manager and one or more stream processing system (SPS) instances, wherein each SPS instance represents one of the instances in the topology; executing the topology master as one or more tasks on one or more of the cluster nodes; executing the stream manager as one or more tasks on one or more of the cluster nodes; and executing each SPS instance as one or more tasks on one or more of the cluster nodes.

In one example approach, the second container further includes a metrics manager. The metrics manager receives metrics information from one or more of the SPS instances and transfers the metrics information to a monitoring system.

In one example approach, the second container further includes a metrics manager. The metrics manager receives metrics information from the stream manager and from one or more of the SPS instances and transfers the metrics information to a monitoring system.

In one example approach, each SPS instance includes a gateway thread and a task execution thread. Executing each SPS instance includes executing each thread as a task on one or more of the cluster nodes.

In one example approach, a distributed coordination service stores state information regarding the topology master and replaces the topology master when needed with a standby topology master based on the state information.

In one example approach, the stream processing system detects failure of the stream manager and, on detecting failure of the stream manager, restarts the stream manager in the second container. Restarting the stream manager includes rediscovering the topology master and retrieving a copy of a physical plan from the topology master.

In one example approach, the stream processing system detects failure of one of the SPS instances and, on detecting failure of the SPS instance, restarts the SPS instance in the second container. Restarting the SPS instance includes contacting the stream manager in the second container, retrieving a copy of a physical plan, and executing user code corresponding to the physical plan.

In some examples, a non-transitory computer-readable storage medium is encoded with instructions that, when executed, cause at least one processor of a computing device to connect two or more instances as a topology, wherein at least one of the instance is a spout and at least one of the instances is a bolt, wherein each spout transfers tuples to one or more bolts and wherein each bolt performs a computation on the transferred tuples; submit a topology to a scheduler, wherein the topology connects two or more instances as a directed graph and wherein the service scheduler receives resource offers from a cluster manager representing computing resources available on one or more of cluster nodes and determines resources to accept and computations to run on the accepted computing resources; schedule the topology as one or more jobs, wherein each job includes two or more containers, including a first container and a second container, the first container including a topology master and the second container including a stream manager and one or more stream processing system (SPS) instances, wherein each SPS instance represents one of the instances in the topology; execute the topology master as one or more tasks on the one or more of cluster nodes; execute the stream manager as one or more tasks on the one or more of cluster nodes; and execute each SPS instance as one or more tasks on the one or more of cluster nodes.

In some examples, in a distributed cluster system having a plurality of topologies, wherein each topology includes a spout and one or more bolts, wherein the one or more bolts includes a first bolt, a method includes receiving data at a queue; transferring, via the spout, data from the queue to a buffer in the first bolt; detecting a backpressure in the buffer of the first bolt; notifying a stream manager that the backpressure was detected in the first bolt; reducing, via the stream manager, a rate of data transfer from the queue through the spout to the first bolt; detecting that the backpressure has eased in the first bolt; notifying a stream manager that the backpressure has eased in the first bolt; and restoring, via the stream manager, a normal rate of data transfer from the queue through the spout to the first bolt.

In some example approaches, a topology is implemented in a container, wherein the container includes the stream manager, the spout and the first bolt and wherein notifying a stream manager includes notifying stream managers in other containers of the backpressure in the container of the first bolt.

In some example approaches, a topology is implemented in a container, wherein the container includes the stream manager and, the spout and the first bolt, wherein notifying a stream manager includes notifying stream managers in other containers of the backpressure in the container of the first bolt, and wherein notifying includes communicating using a Transmission Control Protocol (TCP) socket.

In some examples, a stream processing system includes a cluster manager; a cluster including a plurality of cluster nodes, wherein each cluster node includes computing resources and wherein the cluster nodes are managed by the cluster manager; a service scheduler, wherein the service scheduler receives resource offers from the cluster manager representing computing resources available on one or more of the cluster nodes and determines resources to accept and computations to run on the accepted resources; and a stream processor, wherein the stream processor includes one or more jobs, wherein each job includes two or more containers, including a first container and a second container, the first container including a topology master and the second container including a stream manager and one or more stream processing system (SPS) instances, wherein each SPS instance includes a gateway thread and a task execution thread, wherein the gateway thread controls communication and data movement in and out of the SPS instance, wherein the task execution thread performs a function on data in a data stream received by the gateway thread to arrive at a solution and transfers the solution through the gateway thread to the stream manager, and wherein each thread executes as a task on one or more of the cluster nodes.

In some example approaches, the second container further includes a metrics manager, wherein the stream processing system further comprises a monitoring system, and wherein the metrics manager receives metric information from one or more of the SPS instances and transfers the metric information to the monitoring system.

In some example approaches, the second container further includes a metrics manager, wherein the stream processing system further comprises a monitoring system, and wherein the metrics manager receives metric information from the stream manager and from one or more of the SPS instances and transfers the metric information to the monitoring system.

In some example approaches, a queue buffers data transferred between the gateway thread and the task execution thread, wherein the queue is bounded in size.

In some example approaches, a queue buffers data transferred between the gateway thread and the task execution thread, wherein the queue is reviewed periodically to determine if the queue should be increased or decreased in size.

In some example approaches, a queue buffers data transferred from the task execution thread to the gateway thread, wherein the queue is reviewed periodically to determine if the queue should be increased or decreased in size.

In some example approaches, the data includes metrics information.

In some example approaches, the stream processing system further comprises a distributed coordination service, wherein the distributed coordination service stores information about the topology master and facilitates transfer of master state from the topology master to a standby topology master.

In some example approaches, the stream processing system further comprises a distributed coordination service, wherein the distributed coordination service stores information about the topology master and, when the topology master dies, a standby topology master becomes master and receives state information from the distributed coordination service, wherein the first container restarts and wherein the topology master in the first container becomes a standby topology master.

In some example approaches, when the stream manager in the second container dies, the stream manager is restarted in the second container, the stream manager rediscovers the topology master, and the stream manager retrieves a copy of a physical plan from the topology master to determine if there are any changes in stream manager state for that stream manager.

In some example approaches, when one of the SPS instances in the second container dies, the dead SPS instance is restarted in the second container, the restarted SPS instance contacts the stream manager in the second container, retrieves a copy of a physical plan, and executes user code corresponding to the plan.

In some examples, in a stream processing system including a service scheduler, wherein the service scheduler receives resource offers from a cluster manager representing computing resources available on one or more of the cluster nodes and determines resources to accept and computations to run on the accepted resources and a stream processor, wherein the stream processor includes one or more jobs, wherein each job includes two or more containers, including a first container and a second container, the first container including a topology master and at least one second container, wherein each second container includes a stream manager and one or more stream processing system (SPS) instances, a method includes displaying, within a display, an icon for each SPS instance; in response to moving a pointer icon such that it hovers over one of the icons, displaying metrics information corresponding to the SPS instance associated with the icon; and in response to clicking on one of the icons, displaying information representing activity within the SPS instance associated with the icon.

In one example approach, the method further comprises displaying an icon representing operation of one of the SPS instances, wherein each SPS instance has an icon for each of a plurality of time periods, wherein each icon is in a first state when the SPS instance experiences an anomaly condition during the time period associated with the icon and wherein each icon is in a second state when the SPS instance does not experience an anomaly during the time period associated with the icon.

The details of one or more examples are set forth in the accompanying drawings and the description below. Other features, objects, and advantages of the disclosure will be apparent from the description and drawings, and from the claims.

DETAILED DESCRIPTION

Techniques of the disclosure are directed to real-time analytics of data streams using a stream processing system. As the scale of data being processed in real-time has increased, along with the number of and the diversity of the queries, the limitations of current stream processing systems become apparent. A difficulty facing stream processing systems is that such systems can be difficult to scale. Data streams continue to get larger and analysis more complex. Conventional stream processing systems find it difficult to meet the increased need.

The attached drawings illustrate examples. Elements indicated by reference numbers in the attached drawings correspond to elements indicated by like reference numbers in the following description. In the attached drawings, ellipses indicate the presence of one or more elements similar to those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are merely used to refer to different elements of a same or similar type.

Figure 1:
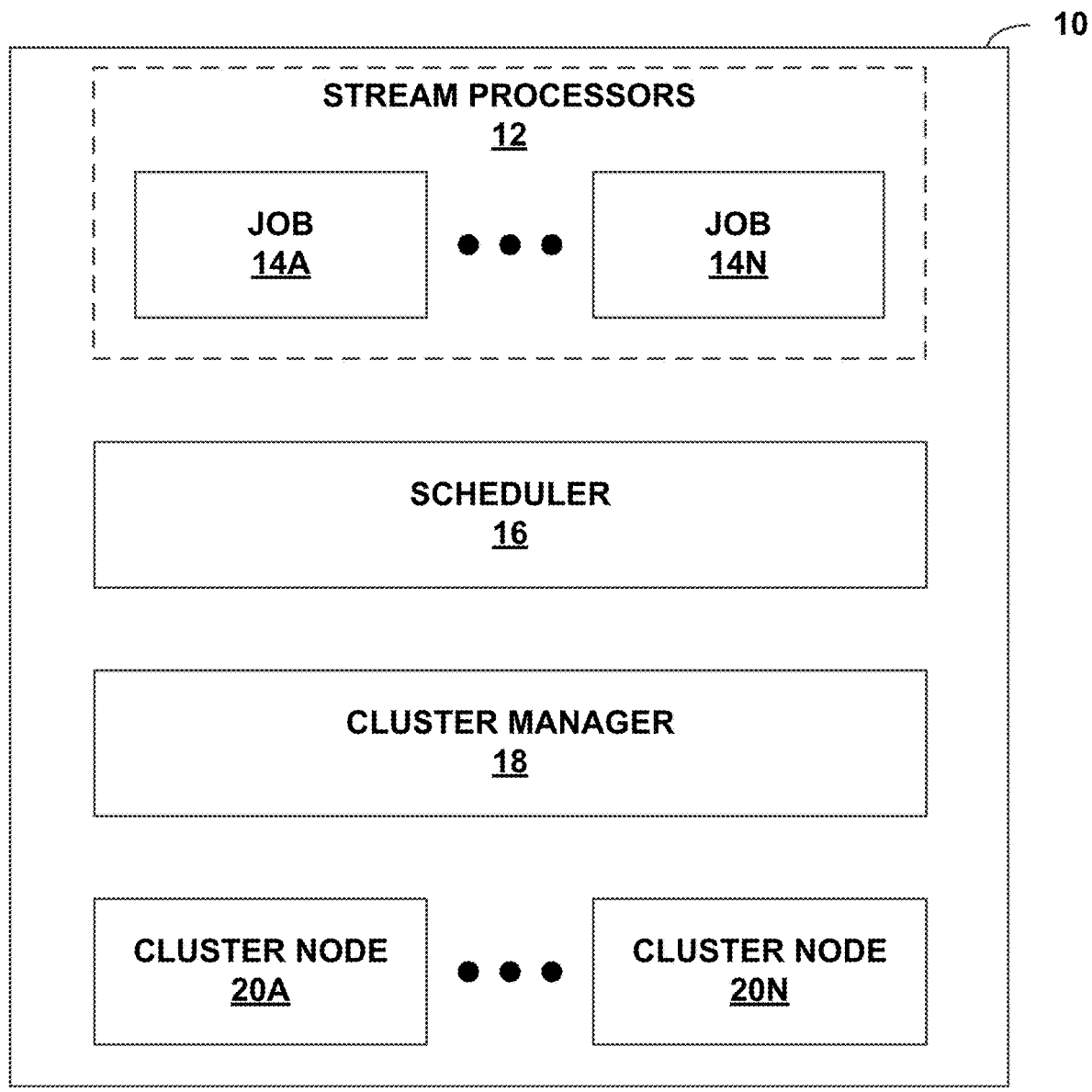
FIG. 1 is a block diagram of an example stream processing system, in accordance with one or more aspects of the present disclosure.

FIG. 1 is a block diagram of an example stream processing system executing in a shared cluster infrastructure, in accordance with one or more aspects of the present disclosure. In the block diagram of FIG. 1, stream processing system 10 includes a stream processor 12 running as scheduler jobs 14A-14N on a scheduler 16. Stream processing system 10 further includes computing resources such as cluster nodes 20A-20N. Cluster nodes 20A-20N are managed by a cluster manager 18.

In one example approach, cluster manager 18 is Apache Mesos. Apache Mesos is a cluster manager that simplifies the running of applications on a shared pool of computing resources such as servers, while providing efficient resource isolation and sharing across distributed applications or frameworks. Representative frameworks include Apache Hadoop, Storm and Ruby on Rails. In operation, Mesos takes a heterogeneous collection of computing resources and allocates those resources via a distributed scheduling mechanism called resource offers. Mesos decides how many resources to offer each framework, while the frameworks decide which resources to accept and which computations to run on them. Mesos is, therefore, a thin resource sharing layer that enables fine-grained sharing across diverse cluster computing frameworks, by giving frameworks a common interface for accessing cluster resources.

In one example approach, scheduler 16 is Apache Aurora. Apache Aurora is a service scheduler that runs on top of Apache Mesos, supporting long-running services that take advantage of Mesos' scalability, fault-tolerance, and resource isolation.

Figure 2:
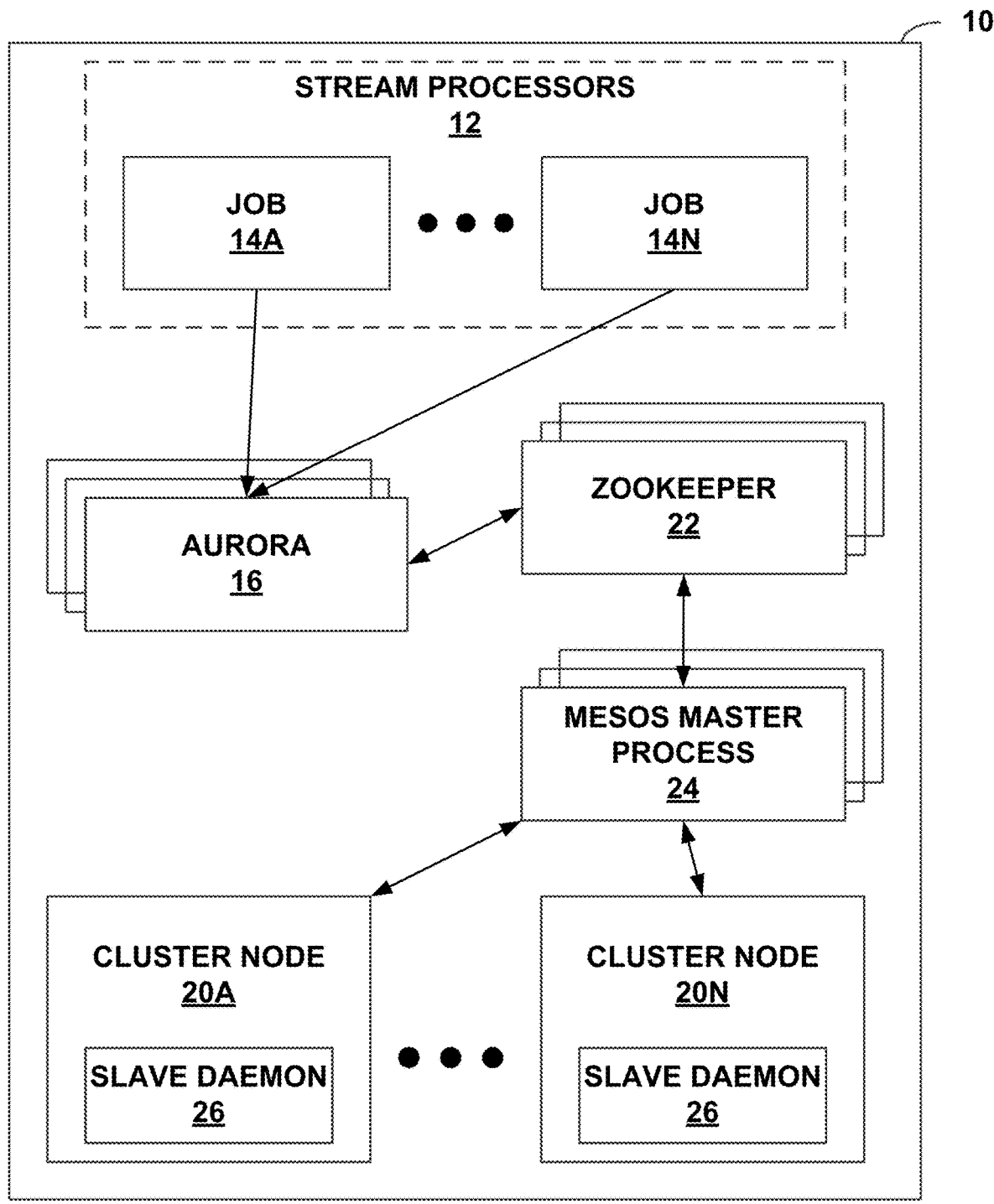
FIG. 2 illustrates a more detailed example of a stream processing system, in accordance with one or more aspects of the present disclosure.

FIG. 2 illustrates a more detailed example of a stream processing system, in accordance with one or more aspects of the present disclosure. In the example approach of FIG. 2, stream processing system 10 includes a stream processor 12 running as scheduler jobs 14A-14N on an Apache Aurora/Mesos cluster. In the example approach of FIG. 2, a distributed coordination service 22 such as Zookeeper offers two services to the cluster. First, distributed coordination service 22 provides a location to store information about the cluster, such as the location of masters and schedulers. Second, distributed coordination service 22 provides a distributed lock service used by Apache Aurora scheduler 16 to implement leader election when there is more than one scheduler 16 running at the same time. In one example approach, multiple distributed coordination services 22 run at the same time, and all work together to provide these services.

In one example approach, Apache Mesos executes as master processes 24 and slave daemons 26 within stream processing system 10. Apache Mesos master processes 24 are machines that are the coordinators within the Apache Mesos cluster. They keep track of all the slave daemons 26, all the tasks running on the slave daemons 26, and all the frameworks (schedulers 16 and distributed coordination service 22) that have started tasks on slave daemons 26. The master processes 24 keep track of resources, and will notify each framework of task state changes, such as a lost task due to a slave daemon rebooting, a network partition, or a multitude of other things.

As shown in FIG. 2, Apache Mesos slave daemons 26 run on each cluster node 20. Slave daemons 26 are the machines where all the tasks in the cluster get run. Slave daemons 26 send offers of resources to the master processes 24, and receive instructions from the master processes 24 to run various tasks. Slave daemons 26 also communicate with the master processes 24 on a regular basis to let the masters know that they are still alive, and to update the masters with any task state changes. In one example approach, slave daemons 26 use a component called an executor (e.g., Thermos) to start tasks.

In one example approach, schedulers 16 receive resource offers from the master process 24, receive job configurations from the user, and use various scheduling constraints and algorithms to schedule and instruct the master processes 24 to run the tasks from each job on selected slave daemons 26. In some such example approaches, based on the configuration of the job, scheduler 16 may restart tasks that have failed.

In one example approach, scheduler 16, master processes 24 and slave daemons 26 are all configured to use a distributed coordination service 22 such as Zookeeper. Such a configuration provides some additional nice properties, such as being able to stand up multiple redundant master and scheduler machines, as they use distributed coordination service 22 to coordinate leader election and manage failover between multiple master processes 24 and multiple schedulers 16.

Figure 3:
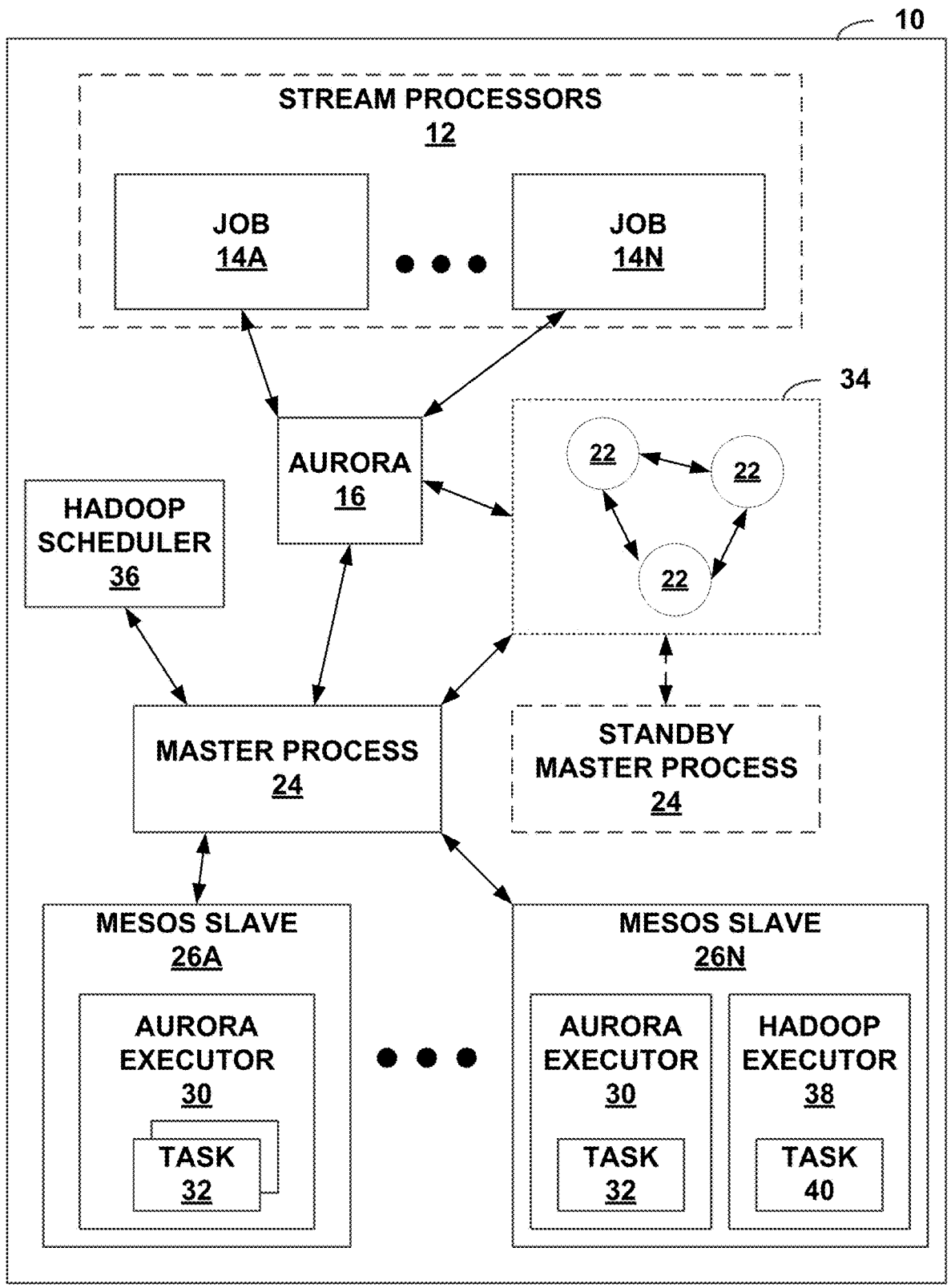
FIG. 3 illustrates another example of a stream processing system, in accordance with one or more aspects of the present disclosure.

FIG. 3 illustrates another example of a stream processing system, in accordance with one or more aspects of the present disclosure. In the example approach of FIG. 3, stream processing system 10 includes a stream processor 12 running as scheduler jobs 14A-14N on scheduler 16. Stream processing system 10 further includes cluster nodes 20A-20N (not shown) that are managed by a cluster manager and a Hadoop scheduler 36 connected to master process 24, for executing Hadoop-based jobs.

In the example approach of FIG. 3, distributed coordination service 22 is connected to scheduler 16 and master process 24. Distributed coordination service 22 provides a location to store information about the cluster, such as the location of master processes 24 and schedulers 16 and 36. Distributed coordination service 22 provides a distributed lock service used by Apache Aurora scheduler 16 to implement leader election when there is more than one scheduler 16 running at the same time. Distributed coordination service also monitors master processes 24 and swaps out one master process for a standby master process 24 when necessary. In one example approach, as is shown in FIG. 3, multiple distributed coordination services 22 run at the same time in a quorum 34, and all work together to provide these services.

Each framework running on Mesos consists of two components: a scheduler 16 that registers with the master process 24 to be offered resources, and an executor process 30 that is launched on cluster nodes 20 with slave daemons 26 to run the framework's tasks 32. While master process 24 determines how many resources to offer to each framework, the frameworks' schedulers 16 select which of the offered resources to use. When a framework accepts offered resources, it passes Mesos a description of the tasks it wants to launch on the resources. In the case of the Hadoop framework, the Hadoop scheduler 36 selects from the resources offered and an executor process 38 executing on one or more cluster nodes 20 initiates and manages the tasks 40.

In one example approach, stream processor 12 processes unbounded streams of data in a manner similar to Storm. There are just three abstractions in Storm: spouts, bolts, and topologies. In one such example approach, a spout is a source of streams in a computation. Typically a spout reads from a queueing broker such as Kestrel, RabbitMQ, or Kafka, but a spout can also generate its own stream or read from somewhere like a streaming API. Spouts generate input tuples that are fed into each topology, and bolts do the actual computation.

In one example approach, a bolt processes any number of input streams and produces any number of new output streams. Most of the logic of a computation goes into bolts, such as functions, filters, streaming joins, streaming aggregations, database queries, and so on.

In one example approach, each topology is a directed acyclic graph of spouts and bolts, with each edge in the graph representing a bolt subscribing to the output stream of some other spout or bolt. A topology may be an arbitrarily complex multi-stage stream computation. Topologies run indefinitely when deployed.

As noted above, in one example approach, stream processor 12 runs topologies within a framework on top of cluster manager 18. Spouts generate input tuples that are fed into the topology, and bolts do the actual computation. Each specific topology is equivalent to a logical query plan in a database system. Such a logical plan is translated into a physical plan before actual execution. As a part of the topology, a programmer specifies the number of tasks for each spout and each bolt (i.e. the degree of parallelism), and how the data is partitioned as it moves across the spout and the bolt tasks (grouping). The actual topology, parallelism specification for each component, and the grouping specification, constitute the physical execution plan that is executed on the machines.

In one such example approach, stream processor 12 uses tuple processing semantics similar to that of Storm. The tuple processing semantics and include the following:
At most once—No tuple is processed more than once, although some tuples may be dropped, and thus may miss being analyzed by the topology.
At least once—Each tuple is guaranteed to be processed at least once, although some tuples may be processed more than once, and may contribute to the result of the topology multiple times.

As noted above, in one example approach stream processor 12 implements a topology that is directed graph of spouts and bolts. Spouts are sources of input data (e.g. a stream of Tweets), and bolts are an abstraction to represent computation on the stream. Spouts often pull data from queues, such as Kafka and Kestrel queues, and generate a stream of tuples, which is then fed into a network of bolts that carry out the required computation.

Figure 4:
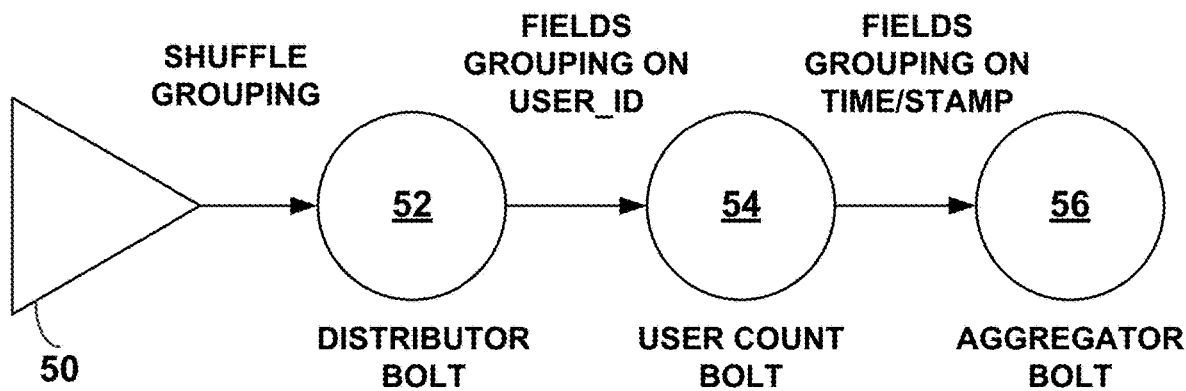
FIG. 4 illustrates an example topology that counts the number of active users in real-time, in accordance with one or more aspects of the present disclosure.

FIG. 4 illustrates an example topology that counts the number of active users in real-time. In the example shown in FIG. 4, a spout 50 pulls data from a Kafka queue and generates a stream of tuples, which is then fed into a network of bolts 52, 54 and 56 that carry out the required computation. Spouts and bolts run as tasks 32, and multiple such tasks 32 may be grouped into an executor 30.

Figure 5:
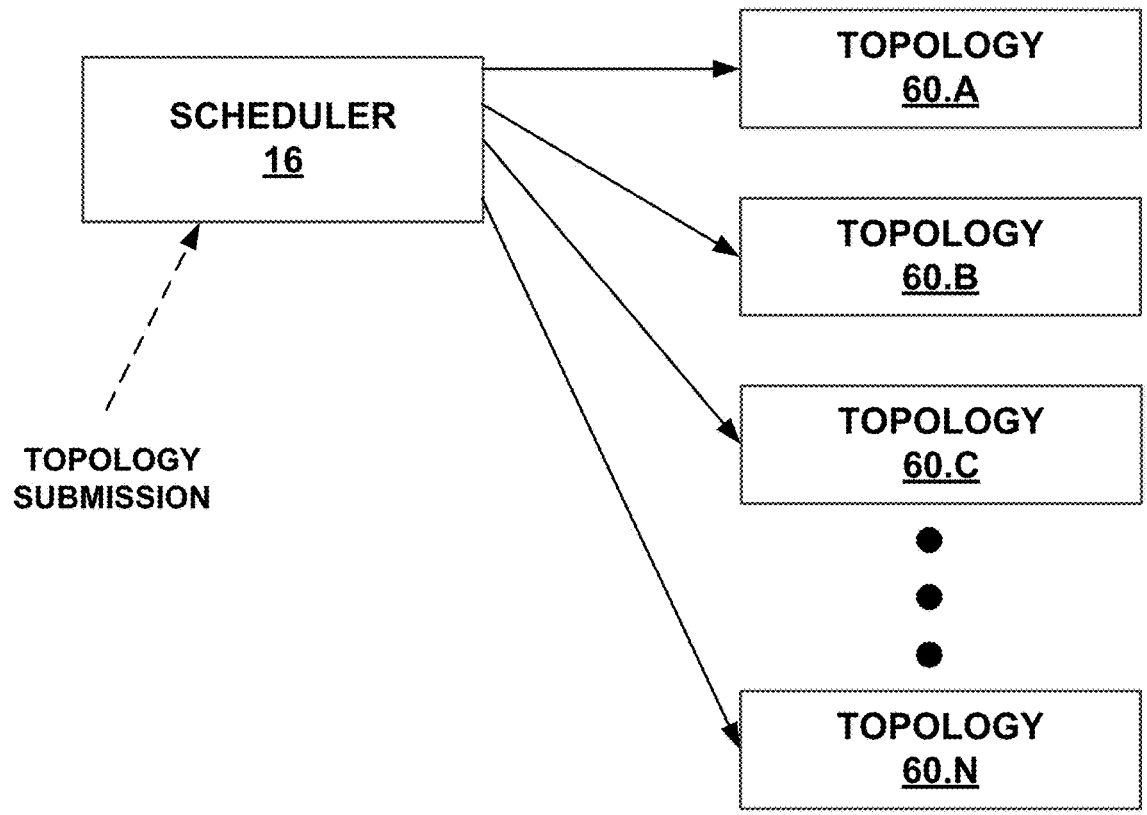
FIG. 5 is a block diagram illustrating one example approach for stream processor 12, in accordance with one or more aspects of the present disclosure.

FIG. 5 is a block diagram illustrating one example approach for stream processor 12, in accordance with one or more aspects of the present disclosure. In one example approach, users employ a programming API to create and deploy topologies 60 to scheduler 16, using, for instance, a command line tool. As noted above, stream processing system 10 may be implemented using a generic service scheduler such as Aurora that runs as a framework on top of Mesos. In other example approaches, however, stream processor 12 implements a scheduler abstraction that facilitates running stream processor 12 on any scheduler (some representative schedulers include YARN, Mesos, ECS (Amazon EC2 Docker Container Service) and Kubernetes). The design of stream processing system 10 is a departure from Storm, where Nimbus (which is an integral component of Storm) was used for scheduling.

In one example approach, Users employ the Storm API to create and submit topologies to scheduler 16. The scheduler runs each topology as a job consisting of several containers. One of the containers runs the topology master, responsible for managing the topology. The remaining containers each run a stream manager responsible for data routing, a metrics manager that collects and reports various metrics and a number of processes called Heron instances which run the user-defined spout/bolt code. These containers are allocated and scheduled by scheduler 16 based on resource availability across the nodes in the cluster. In one such example approach, the metadata for the topology, such as physical plan and execution details, are kept in Zookeeper 22.

Figure 6:
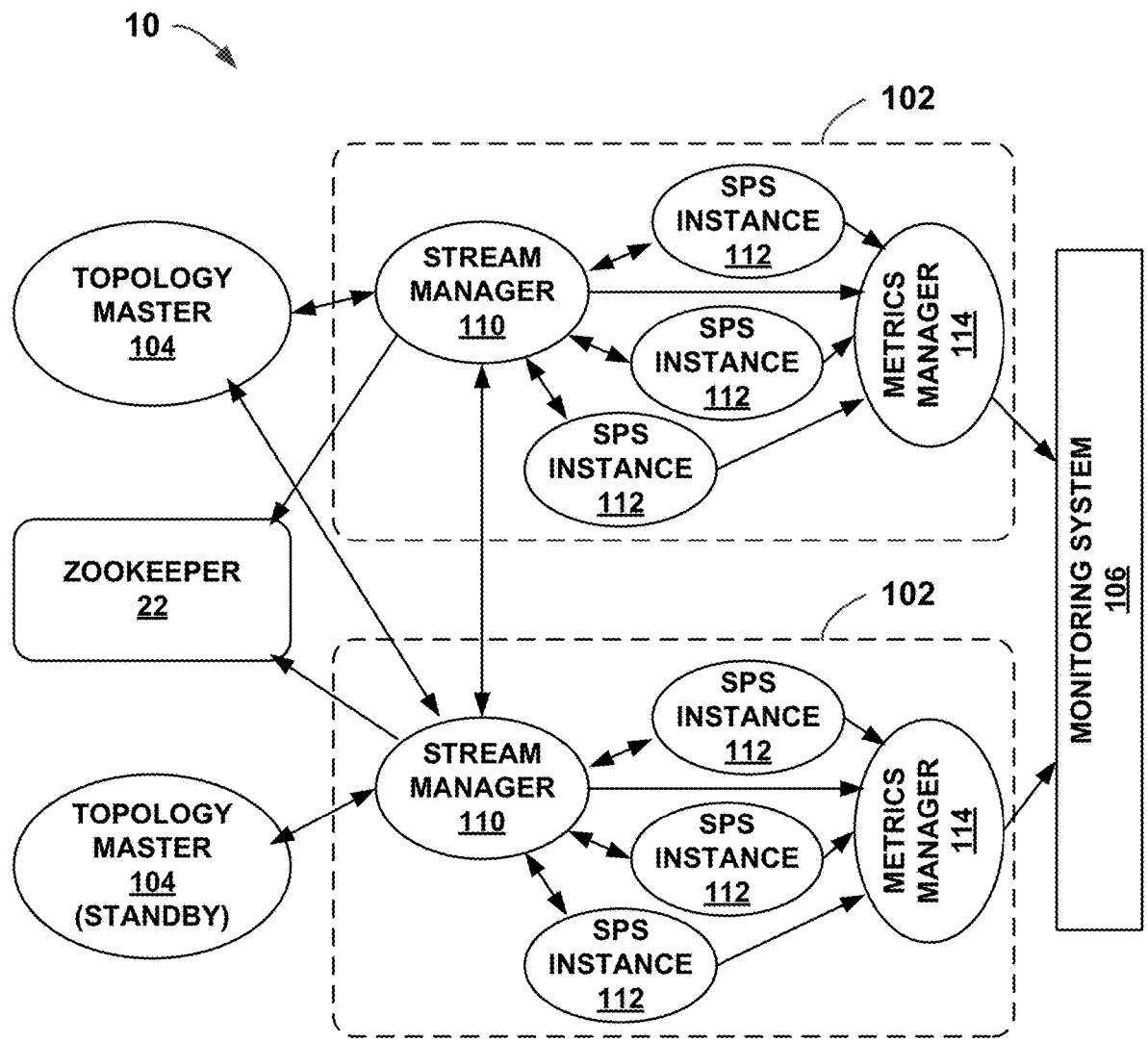
FIG. 6 is a block diagram illustrating an example containerized stream processing system, in accordance with one or more aspects of the present disclosure.

FIG. 6 is a block diagram illustrating an example containerized stream processing system, in accordance with one or more aspects of the present disclosure. In one example approach, each topology 60 runs as a job 14 organized as two or more containers, as shown in FIG. 6. The first container runs a process called Topology Master 104. The remaining containers each run a Stream Manager 110, a Metrics Manager 114, and one or more processes termed stream processing system (SPS) instances 112 (which are spouts/bolts that run user logic code). Multiple containers can be launched on a single physical node 20. These containers are allocated and scheduled by a scheduler 16 such as Aurora based on the resource availability across the nodes 20 in the cluster. (In some example approaches, scheduler 16 maps these containers to Linux cgroups.) As shown in FIG. 6, a standby Topology Master 104 may be run for availability.

In the example approach of FIG. 6, the metadata for the topology (which includes information about the user who launched the job, the time of launch, and the execution details) are kept in a distributed coordination service 22, such as Zookeeper. In one example approach, SPS instances 112 are written in Java, as they need to run user logic code (which is written in Java). In one such example approach, there is one Java Virtual Machine (JVM) per SPS instance 112. In one example approach, all SPS processes communicate with each other using protocol buffers (protobufs). In one example approach, metric information representative of operation of the stream manager 110 and operation of instances 112 are written to metrics manager 114 as shown, and from there is passed through monitoring system 106 to a user interface.

Topology Master 104 will be discussed next. In one example approach, Topology Master 104 is responsible for managing the topology throughout its existence. It provides a single point of contact for discovering the status of the topology (and thus is similar to the Application Master in YARN). Upon startup, Topology Master 104 makes itself discoverable by creating an ephemeral node at a well-known location in Zookeeper. The ephemeral node serves the following two purposes:

1) It prevents multiple Topology Masters from becoming the master for the same topology, thereby providing different processes of the topology a consistent view of the entire topology.

2) It allows any other process that belongs to the topology to discover Topology Master 104.

Topology Master 104 also serves as a gateway for the topology metrics through an endpoint. Note that since the Topology Master is not involved in the data processing path, it is not a bottleneck. In some example approaches, as shown in FIG. 6, a standby topology master 104 can be swapped in to replace the current topology master as necessary based on state saved in zookeeper 22.

Stream Manager 110 will be discussed next. One key function of Stream Manager 110 is to manage the routing of tuples efficiently. Each SPS instance 112 connects to its local Stream Manager 110 to send and receive tuples. All Stream Managers 110 in a topology connect between themselves to form a $O(k^2)$ connection network, where k is the number of containers/Stream Manager in the physical plan of the topology. Note that since the number of SPS instances, n, is generally much larger than k, this design permits a way to scale the communication overlay network by multiplexing $O(n^2)$ logical channels over $O(k^2)$ physical connections. Furthermore, any tuples routed from one SPS instance 112 to another SPS instance 112 in the same container is routed using a local short-circuiting mechanism.

Figure 7:
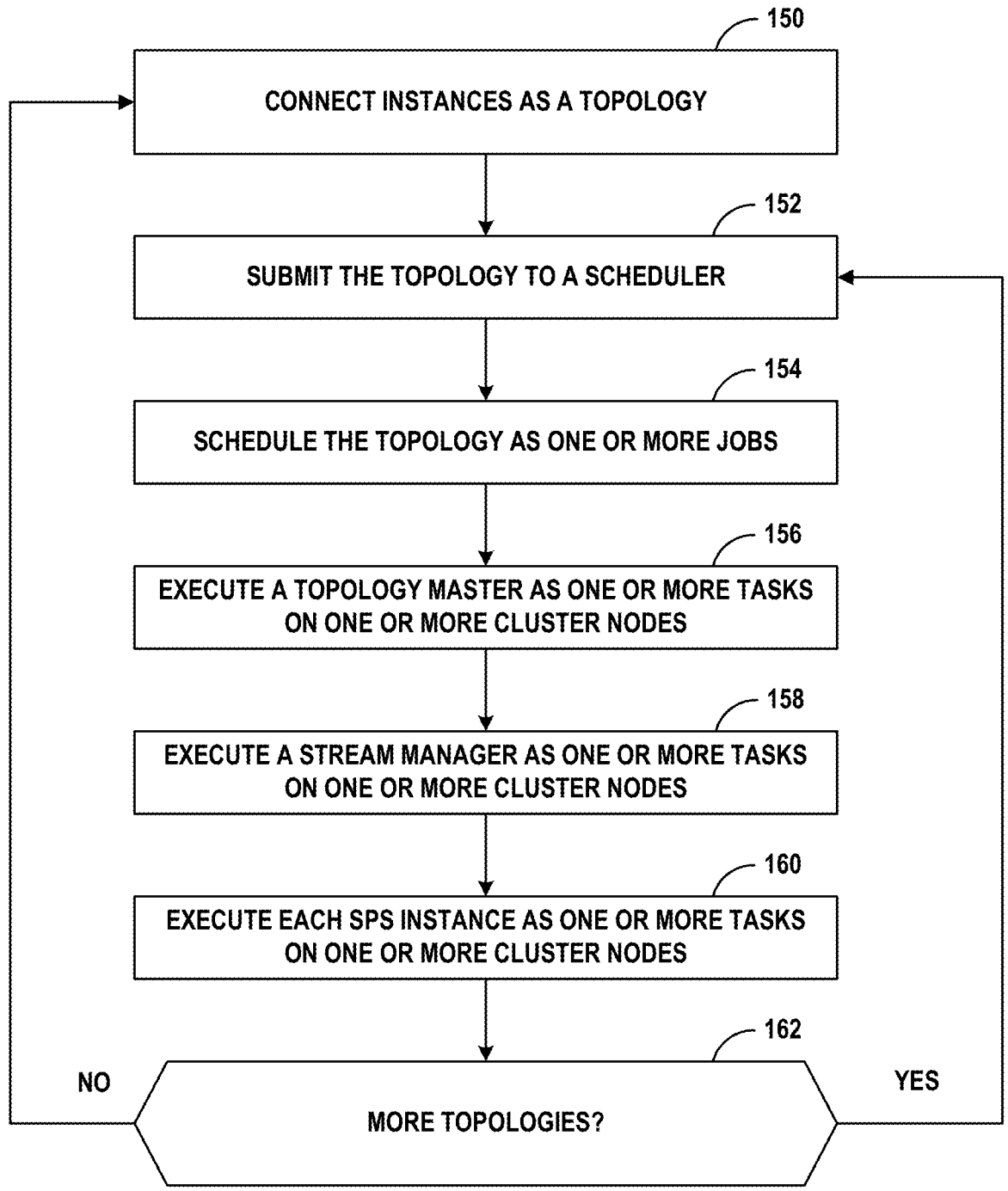
FIG. 7 is a flow diagram illustrating execution of a stream processing topology, in accordance with one or more aspects of the present disclosure.

FIG. 7 is a flow diagram illustrating execution of a stream processing topology, in accordance with one or more aspects of the present disclosure. In the example approach of FIG. 7, stream processing system connects two or more instances as a topology (150). At least one of the instances is a spout and at least one of the instances is a bolt, wherein each spout transfers tuples to one or more bolts and wherein each bolt performs a computation on the transferred tuples. System 10 submits the topology to a scheduler, wherein the service scheduler receives resource offers from a cluster manager representing computing resources available on one or more of cluster nodes and determines resources to accept and computations to run on the accepted computing resources (152). The topology is scheduled as one or more jobs, wherein each job includes two or more containers, including a first container and a second container, the first container including a topology master and the second container including a stream manager and one or more stream processing system (SPS) instances, wherein each SPS instance represents one of the instances in the topology (154).

System 10 executes the topology master as one or more tasks on one or more of the cluster nodes (156), executes the stream manager as one or more tasks on one or more of the cluster nodes (158) and executes each SPS instance as one or more tasks on one or more of the cluster nodes (160). System 10 checks for more topologies to schedule (162). If there are more topologies to schedule, system 10 moves to 152. Otherwise, system 10 moves to 150.

In one example approach, the second container further includes a metrics manager. The metrics manager receives metrics information from one or more of the SPS instances and transfers the metrics information to a monitoring system.

In one example approach, the second container further includes a metrics manager. The metrics manager receives metrics information from the stream manager and from one or more of the SPS instances and transfers the metrics information to a monitoring system.

In one example approach, each SPS instance includes a gateway thread and a task execution thread. Executing each SPS instance includes executing each thread as a task on one or more of the cluster nodes.

In one example approach, a distributed coordination service stores state information regarding the topology master and replaces the topology master when needed with a standby topology master based on the state information.

In one example approach, system 10 detects failure of the stream manager and, on detecting failure of the stream manager, restarts the stream manager in the second container. Restarting the stream manager includes rediscovering the topology master and retrieving a copy of a physical plan from the topology master.

In one example approach, system 10 detects failure of one of the SPS instances and, on detecting failure of the SPS instance, restarts the SPS instance in the second container. Restarting the SPS instance includes contacting the stream manager in the second container, retrieving a copy of a physical plan, and executing user code corresponding to the physical plan.

Previous approaches to stream processing did a poor job handling backpressure. If the receiver component was unable to handle incoming data/tuples, then the sender simply drops tuples. This is a fail-fast mechanism, and a simple strategy, but it has the following disadvantages:

If acknowledgements are disabled, this mechanism will result in unbounded tuple drops, making it hard to get visibility about these drops.

Work done by upstream components is lost.

System behavior becomes less predictable.

In extreme scenarios, this design causes the topology to not make any progress while consuming all its resources. Storm employs this approach.

Unlike Storm, stream processor 12 employs a backpressure mechanism to dynamically adjust the rate at which data flows through the topology. This mechanism is important in topologies where different components may execute at different speeds (and the speed of processing in each component may change over time). For example, consider a pipeline of work in which the later/downstream stages are running slow, or have slowed down due to data or execution skew. In this case, if the earlier/upstream stages do not slow down, it may lead to buffers building up long queues, or result, as in Storm, in the system dropping tuples. If tuples are dropped mid-stream, then there is a potential loss in efficiency as the computation already incurred for those tuples is wasted. A backpressure mechanism is needed to slow down the earlier stages.

Figure 8A:
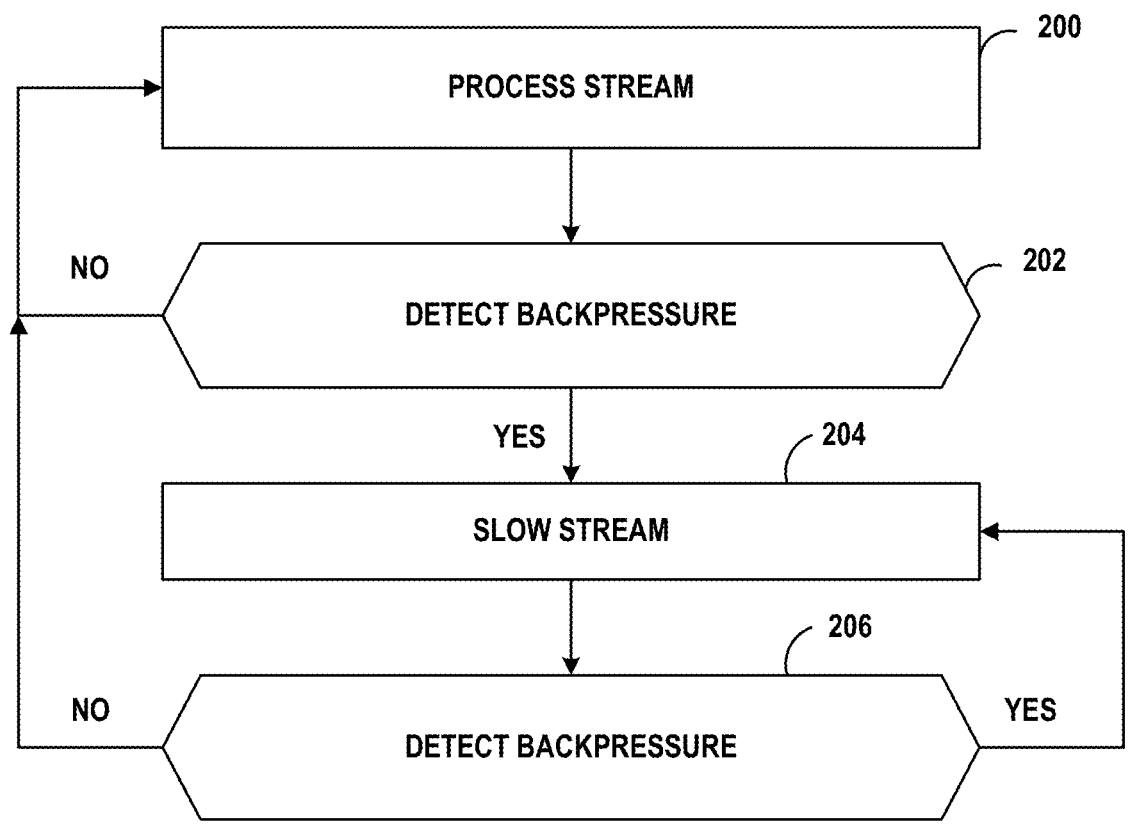
FIG. 8A is a flow diagram illustrating a backpressure mechanism, in accordance with one or more aspects of the present disclosure.

FIG. 8A is a flow diagram illustrating a backpressure mechanism, in accordance with one or more aspects of the present disclosure. Stream processing system 10 processes a data stream as described above (200). A check is made to determine if backpressure is happening in a SPS instance 112 (202). If not, stream processing system 10 continues to process the data stream (200). If backpressure is detected at 202, stream processing system 10 slows transfer of tuples (204). A check is made to determine if backpressure is still happening in the SPS instance 112 (206). If not, stream processing system 10 returns to normal processing of the data stream (200). If backpressure is detected at 206, stream processing system 10 continues transferring tuples at a reduced transfer rate (204).

In one example approach, stream processing system 10 employs a Transmission Control Protocol (TCP) windowing mechanism to propagate backpressure from instances 112 to upstream components. Since, in some such example approaches, instances 112 and Stream Manager 110 (in each container 102) communicate using TCP sockets, the rate of draining from the send/receive buffers is equal to the rate of production/consumption by the local instance 112. If an instance 112 is executing slowly, then its receive buffer starts to fill up. The Stream Manager 110 that is pushing data to this instance 112 will recognize this situation, as its own send buffer will also fill up. The TCP-based backpressure mechanism then propagates to the other Stream Managers 110 and to SPS instances 112 upstream. Note that this backpressure is only cleared when the original (slow) SPS instance 112 starts catching up again.

Figure 8B:
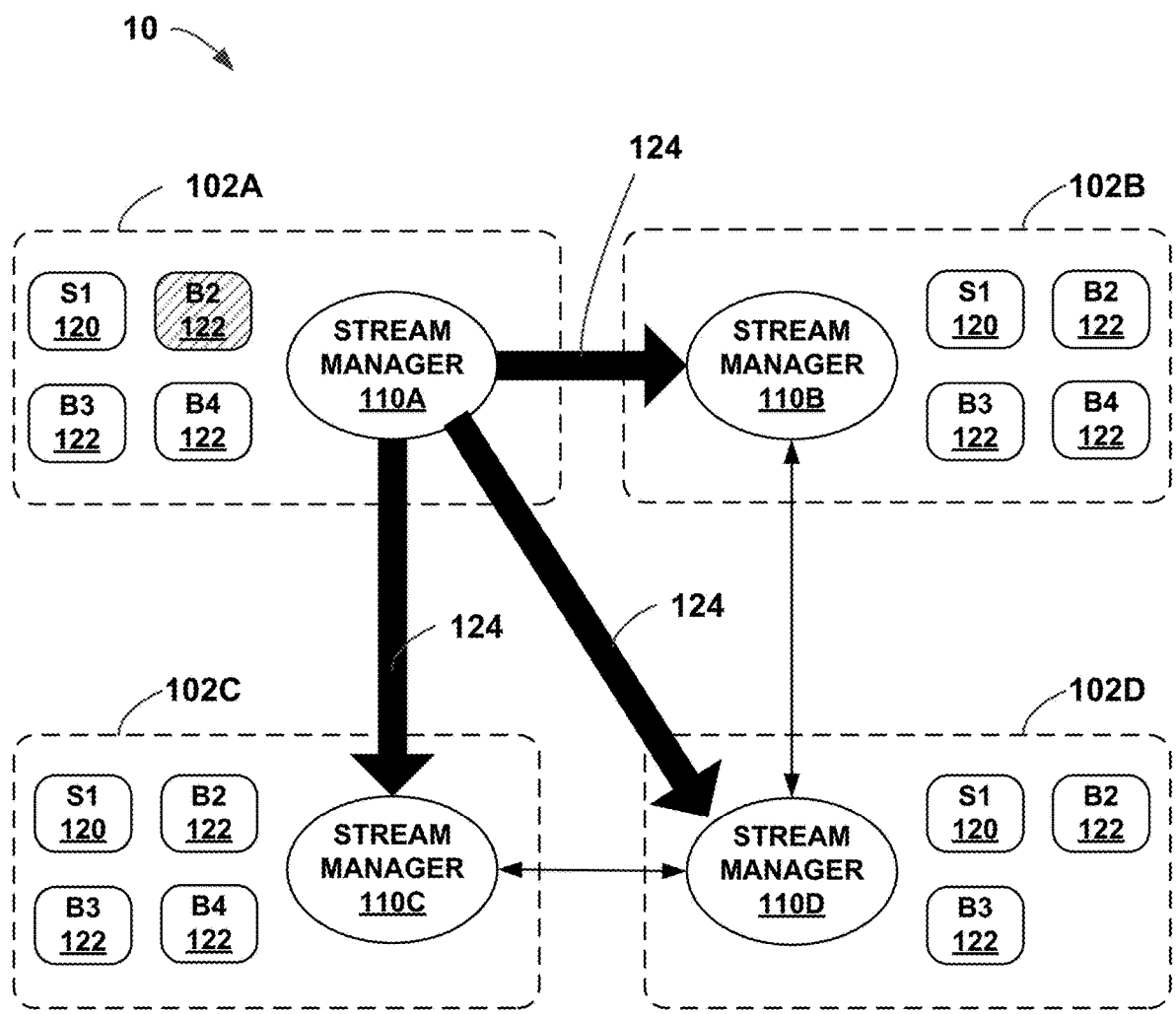
FIG. 8B is a block diagram illustrating a Transmission Control Protocol (TCP) windowing mechanism used to propagate backpressure from instances to upstream components, in accordance with one or more aspects of the present disclosure.

FIG. 8B is a block diagram illustrating a Transmission Control Protocol (TCP) windowing mechanism used to propagate backpressure from instances to upstream components, in accordance with one or more aspects of the present disclosure. In the example shown in FIG. 8B, stream manager 110A detects backpressure in the B2 instance of a bolt 122 in container 102A (the presence of backpressure is shown by cross-hatching). Stream manager 110A transmits a TCP message 124 to stream managers 110 upstream of bolt B2, propagating this knowledge to containers 102 upstream.

This simple TCP-based backpressure mechanism is easy to implement. However, this method may not work well in practice because, in some approaches, as noted above, multiple logical channels (between instances 112) are overlaid on top of the physical connections between Stream Managers 110. This multiplexing may cause the upstream SPS instances 112 to slow down, but, inadvertently, the mechanism may also cause downstream SPS instances 112 (that are on the same connection) to slow down. Consequently, any congestion clears very slowly, causing the entire topology to experience significant and unduly long-lasting performance degradation.

In another example approach, stream processing system 10 detects downstream backpressure at a spout 120 and adjusts transfer of tuples from the spout 120 to the downstream problem SPS instance 112 accordingly. In one example approach, Stream Managers 110 upstream from the bolt B2 clamp down their local spouts 120 to reduce the rate at which new data is injected into the topology. This approach is used in conjunction with a TCP-based backpressure mechanism between the Stream Managers 110 and the SPS instances 112 such as described with respect to FIGS. 8A and 8B above. In one such example approach, when a Stream Manager 110 realizes that one or more of its SPS instances 112 are slowing down, the Stream Manager 110 identifies local spouts 120 and either stops reading data from them or reduces the rate at which the Stream Manager 110 reads data from them. This mechanism has the effect of slowing down the spout. The spout's send buffer will eventually fill up, and the spout will eventually block.

Figure 9A:
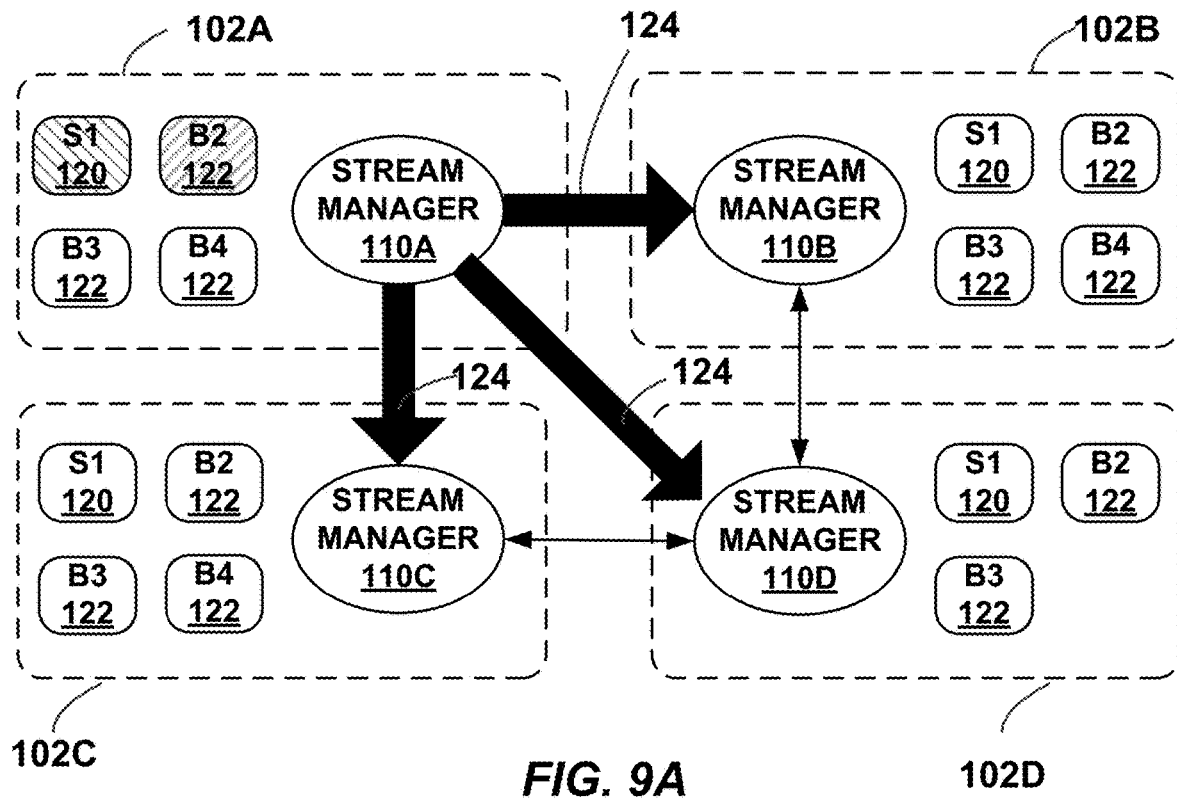
FIGS. 9A and 9B are block diagrams illustrating a spout-based backpressure mechanism used to propagate backpressure from instances to upstream components, in accordance with one or more aspects of the present disclosure.
Figure 9B:
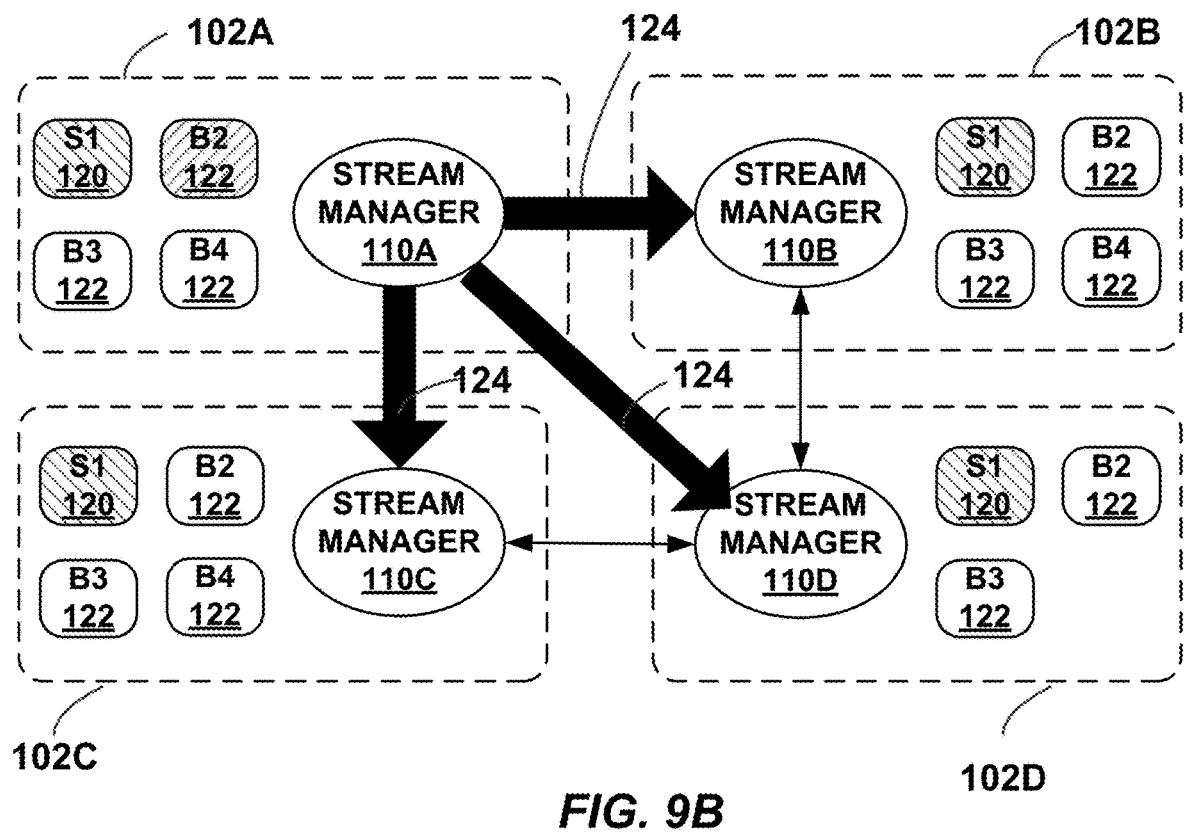

FIGS. 9A and 9B are block diagrams illustrating a spout-based backpressure mechanism used to propagate backpressure from instances to upstream components, in accordance with one or more aspects of the present disclosure. In the example shown in FIG. 9A, stream manager 110A detects backpressure in the B2 instance of a bolt 122 in container 102A (the presence of backpressure is shown by cross-hatching). Stream manager 110A commands the S1 instance of spout 120 in container 102A to reduce or stop the transfer of tuples to the B2 instance of a bolt 122 in container 102A (the reduction or halt in tuple transfer rate is shown by reverse cross-hatching).

In addition, in one example approach, stream manager 110A transmits a TCP message 124 to stream managers 110 upstream of spout 51 and bolt B2 as in the example of FIG. 8B above, propagating this knowledge to containers 102 upstream. Each upstream stream manager 110 commands the Si instance of spout 120 in its container 102A to reduce or stop the transfer of tuples to container 102A (the reduction or halt in tuple transfer rate is shown by reverse cross-hatching). Propagation of this reduction of tuple flow and the shutdown or slow down on upstream spouts 120 is shown in FIG. 9B.

In one example approach, the affected Stream Manager 110 sends a special start backpressure message 124 to other Stream Managers 110 requesting them to clamp down their local spouts. When the other Stream Managers receive this special message, the Stream Managers oblige by not reading tuples from their local spouts. Once the slow SPS instance 112 catches up, the local Stream Manager 110 sends stop backpressure messages to other Stream Managers 110. When the other Stream Managers 110 receive this special message, they restart consuming data from their local spouts again.

This approach directly clamps down the most upstream component (spouts). This method may be less than optimal because we may unnecessarily clamp down a spout, when simply slowing down an immediate upstream producer is all that was actually necessary. The other potential disadvantage of this approach is the additional message passing overhead. However, the advantage of this approach is that the reaction time to flow rate changes is small, irrespective of the depth of the topology.

In yet another example approach, stream processing system 10 employs a stage-by-stage backpressure mechanism to adjust to downstream backpressure. In one such approach, a topology can be viewed as consisting of multiple stages. In this approach, we gradually propagate the backpressure stage-by-stage until it reaches the spouts (which represent the 1st stage in any topology). As in the spout backpressure method, this strategy is used in conjunction with the TCP backpressure mechanism between the Stream Managers 110 and the SPS instances 112.

Figure 10:
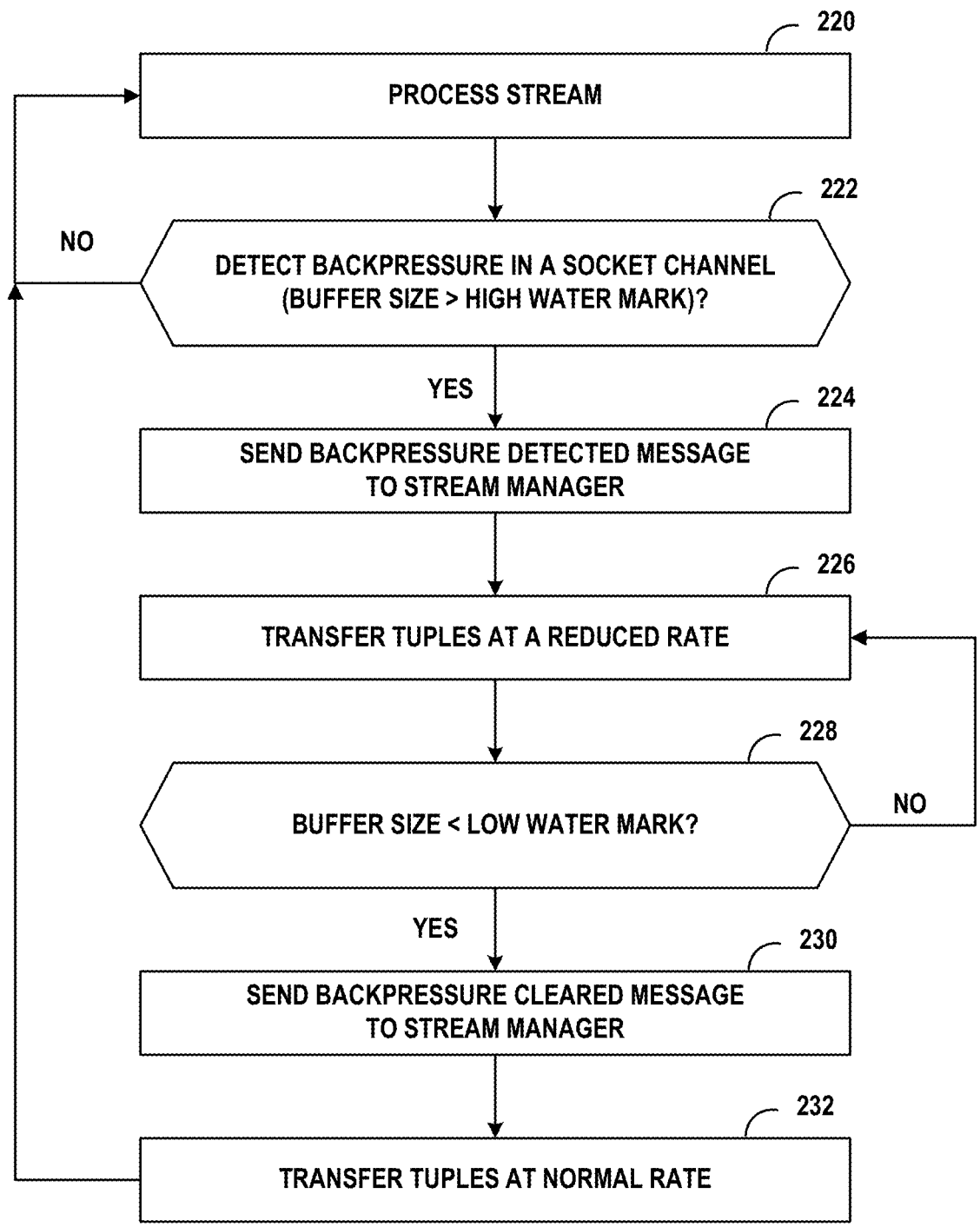
FIG. 10 is a flow diagram illustrating a spout-based backpressure mechanism, in accordance with one or more aspects of the present disclosure.

FIG. 10 is a flow diagram illustrating a spout-based backpressure mechanism, in accordance with one or more aspects of the present disclosure. A spout-based backpressure mechanism may be preferable to a stage-by-stage backpressure mechanism since it may be simpler to implement than the stage-by-stage backpressure mechanism. In addition, the spout backpressure mechanism as described works well in practice, and also aids in debug-ability, as one can see when skew-related events happen and the component that was the root cause of the backpressure trigger.

In one example spout backpressure mechanism, every socket channel is associated with an application-level buffer that is bounded in size by both a high water mark and a low water mark. Stream processing system 10 processes a data stream as described above (220). A check is made to determine if backpressure is happening in a SPS instance 112 (222). In the example shown in FIG. 10, a backpressure condition is detected in an SPS instance 112 when the socket channel buffer exceeds the high water mark and is cleared when the socket channel buffer subsequently clears the low water mark. If a backpressure condition is detected at 222, stream processing system 10 continues to process the data stream (220). If backpressure is detected at 222, SPS instance 112 slows transfer of tuples from upstream spouts and bolts by transmitting a message to the Stream Manager indicating that backpressure has been detected (224). In one example approach, Stream Manager 110 reduces the transfer rate of tuples to the affected SPS instance 112 by either stopping an upstream spout from transmitting tuples destined for the affected SPS instance 112 or reducing the rate at which such tuples are transmitted by the spout (226).

A check is made to determine if backpressure is still present in the SPS instance 112 (228). In the example shown in FIG. 10, a check is made to determine if the socket channel buffer associated with the affected SPS instance 112 is below the low water mark. If backpressure is still present in the affected SPS instance 112, Stream Manager 110 continues to restrict transfer of data from upstream spouts (226).

If backpressure is no longer present in the affected SPS instance 112 (i.e., the socket channel buffer associated with the affected SPS instance 112 is below the low water mark), SPS instance 112 transmits a message to the Stream Manager indicating that backpressure is no longer present (230). In one example approach, when Stream Manager 110 receives a message indicating that backpressure is no longer present, Stream Manager 110 notifies upstream spouts to increase the transfer rate of tuples to the affected SPS instance 112 to a normal transfer rate (232) before moving to 220.

In one example approach, as described above, backpressure is triggered when the buffer size reaches the high water mark, and remains in effect until the buffer size goes below the low water mark. The rationale for this design is to prevent a topology from rapidly oscillating between going into and coming out of the backpressure mitigation mode.

A consequence of the design described above is that once a tuple is emitted from the spout, stream processing system 10 does not drop the tuple, except during process or machine failure scenarios. This behavior makes tuple failures more deterministic.

When a topology is in backpressure mode, it goes as fast as the slowest component. If this situation continues to persist for a while, it may lead to data building up in the "source" queues from which the spout reads the data. Depending on the topology, spouts can be configured to drop older data, when necessary.

Next, SPS instances 112 will be discussed in greater detail. The main work for a spout or a bolt is carried out in the SPS instance 112. Unlike the Storm worker, each SPS instance 112 is a JVM process, which runs only a single task of the spout or the bolt. Such a design allows us to easily debug/profile either a spout or bolt, since the developer can easily see the sequence of events and logs that originate from the SPS instance 112. In addition, since the complexity of data movement has been moved to the Stream Managers 110, it may be possible to write native SPS instances 112 in other languages in the future.

In one example approach, SPS instances 112 are implemented in a single thread. In the single-threaded design, a main thread maintains a TCP communication channel to the local Stream Manager 110 and waits for tuples. Once a tuple arrives, user logic code is invoked in the same thread. If the user logic code program generates an output tuple, it is buffered. Once the buffer exceeds a certain threshold, it is delivered to the local Stream Manager.

While this approach has the advantage of simplicity, it has several disadvantages, as the user code can potentially block due to a variety of reasons, including:

Invoking the sleep system call for a finite duration of time
Using read/write system calls for file or socket I/O; and
Calling thread synchronization primitives Due to the number of ways the user code can potentially block, a single thread approach is not desirable. In particular, such blocking makes this approach undesirable for periodic activities such as metrics reporting. Since the duration of blocking could potentially vary, this approach also leads to unpredictable behavior. And, if the metrics are not collected and sent in a timely manner, one cannot reliably troubleshoot whether an SPS instance 112 is in a "bad" state.

Figure 11:
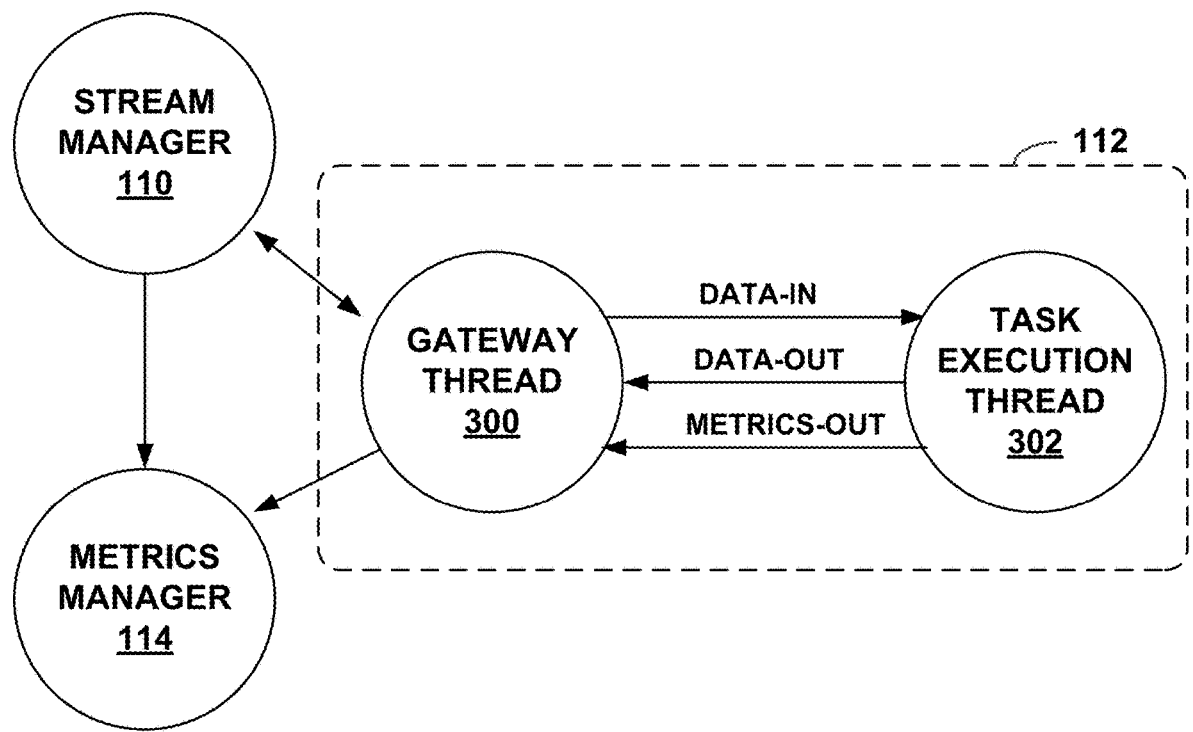
FIG. 11 is a block diagram of an example approach to implementing a stream processing system (SPS) instance, in accordance with one or more aspects of the present disclosure.

In another example approach, SPS instances 112 are implemented in a dual-thread design. FIG. 11 is a block diagram of an example approach to implementing a stream processing system (SPS) instance, in accordance with one or more aspects of the present disclosure. In the dual-thread approach of FIG. 11, each SPS instance 112 includes two threads: a Gateway thread 300 and a Task Execution thread 302, as shown in FIG. 11. In one example approach, Gateway thread 300 is responsible for controlling all the communication and data movement in and out from instance 112. It maintains TCP connections to the local Stream Manager and the metrics manager. It is also responsible for receiving incoming tuples from the local Stream Manager. These tuples are sent to the Task Execution thread for processing.

In the example approach of FIG. 11, Task Execution thread 302 runs user code. In one such example approach, when the task execution thread 302 is started, it executes the "open" or "prepare" method depending upon whether the instance is executing a spout or a bolt, respectively. In the case of a bolt, when tuples arrive, the task execution thread invokes the "execute" method with the incoming tuple for processing. In the case of a spout, in one example approach, a spout 120 repeatedly calls the "nextTuple" method to fetch data from the source, and then injects this data as tuples into the topology. In one such example approach, four tuples are transferred in each batch of tuples. In another example approach, batch size is configurable such that the number of tuples transferred in each batch can be set by the user.

In one example approach, the emitted tuples from either spout or bolt are sent to the Gateway thread 300, which forwards the tuples to the local Stream Manager 110. In addition to processing tuples, in the some example approaches, Task Execution thread 302 collects metrics corresponding to performance of the SPS instance and forwards the collected metrics to gateway thread 300. In some approaches, the collected metrics include one or more of, for example, the number of tuples executed, the number of tuples emitted, the number of tuples acknowledged, and the latency experienced during the processing of tuples.

In one example approach, Gateway thread 300 and Task Execution thread 302 communicate between themselves using three unidirectional queues, as shown in FIG. 11. In one such example approach, Gateway thread 300 uses the data-in queue to push tuples to the Task Execution thread 302 for processing. The Task Execution thread 302 uses the data-out queue to send tuples to the Gateway thread 300 (for sending to other parts of the topology). In some such example approaches, the metrics-out queue is used by the Task Execution thread 302 to pass the collected metrics to the Gateway thread 300 and through the Gateway thread 300 to metrics manager 114. In one example approach, stream manager 110 is also connected to metrics manager 114 in order to write operations information generated by stream manager 110 to metrics manager 114.

In one example approach, the data-in and the data-out queues are bounded in size. Gateway Execution thread 300 stops reading from the local Stream Manager 110 when the data-in queue exceeds this bound. This action triggers one of the backpressure mechanisms described above at the local Stream Manager 110. Similarly, when items in the data-out queue exceed the bound, the Gateway thread 300 can assume that the local Stream Manager cannot receive more data, and that Task Execution thread 302 should not emit or execute any more tuples.

When running large topologies in production with bounded queue sizes, stream processing system 10 often experienced unexpected garbage collection (GC) issues. Everything worked fine until, for instance, a network outage happened and Gateway thread 300 was unable to send tuples from the data-out queue. Tuples would then start to back up in the data-out queue, and because they are live objects, they could not be reclaimed. This situation then caused the corresponding SPS instance 112 to reach its memory limit. Once the network recovered, Gateway thread 300 would start reading tuples from the local Stream Manager, as well as sending out tuples from the data-out queue. If the Gateway thread 300 read tuples from the Stream Manager 110 before sending out tuples, any new object construction could trigger garbage collection, since nearly all of the available memory was already used up, quickly resulting in further performance degradation.

In one example approach, therefore, stream processor 12 periodically checks the capacity of the data-out and data-in queues and increases or decreases these queue sizes accordingly. In one such example approach, if the capacity of the queue grows over a configurable limit, then it is reduced (currently to half of the last capacity). This mechanism is invoked periodically until the capacity of the queue returns to a stable constant value, or the capacity reaches zero. When the capacity of the queue becomes zero, new tuples cannot be injected, and, in many cases, new tuples cannot be produced. As a consequence, it is easier to recover from garbage collection (GC) issues. Similarly, when the outstanding number of tuples in the queue is smaller than the configured limit, the capacity is gradually increased until the queue length either reaches the configured limit or hits the maximum capacity value.

Metrics Manager 114 will be discussed next. Metrics Manager 114 collects and exports metrics from all the components in the system. These metrics include system metrics and user metrics for the topologies 60. In one example approach, there is one metrics manager 114 for each container 102, to which the Stream Manager 110 and SPS instances 112 report their metrics.

In one example approach, metrics are sent from each container to an in-house monitoring system. In one such example approach, metric managers for each container pass the metrics to Topology Master 104 for displaying in external user interfaces. The separation of metrics reporting using local metric manager provides flexibility to support other monitoring systems (such as Ganglia and Graphite) in the future.

Startup Sequences and Failure Scenarios will be discussed next. When a topology is submitted to scheduler 16, a sequence of steps is triggered. Upon submission, the scheduler (e.g., Aurora) allocates the necessary resources and schedules the topology containers in several machines in the cluster. Topology Master 104 comes up on the first container, and makes itself discoverable using a Zookeeper 22 ephemeral node. Meanwhile, a Stream Manager 110 on each container 102 consults Zookeeper 22 to discover the Topology Master 104. Each Stream Manager 110 connects to Topology Master 104 and periodically sends heartbeats.

When all the Stream Managers 110 are connected, the Topology Master 104 runs an assignment algorithm to assign different components of the topology (spouts and bolts) to different containers. This is called the physical plan in our terminology. Once the assignment is complete, the Stream Managers 110 get the entire physical plan from the Topology Master 104, which helps the Stream Managers 110 to discover each other. Now the Stream Managers 110 connect to each other to form a fully-connected network. Meanwhile, the SPS instances 112 come up, discover their local Stream Manager, download their portion of the physical plan, and start executing. After these steps are completed, data/tuples starts flowing through the topology. For safekeeping, the Topology Master 104 writes the physical plan to Zookeeper 22 so it can rediscover the state in case of failure.

When a topology 60 is executing, there are several failure scenarios that could affect some portion of the topology 60, and sometimes even the entire topology itself. These scenarios consist of the death of processes, the failure of containers, and the failure of machines. When the Topology Master 104 process dies, the container restarts the failed process, and the Topology Master 104 recovers its state from Zookeeper 22. When a topology 60 is started with a standby Topology Master 104, the standby Topology Master 104 becomes the master, and the restarted Topology Master 104 becomes the standby. Meanwhile, the Stream Managers 110 that have open channels to the Topology Master 104 rediscover the new Topology Master 104, and connect to it.

Similarly when a Stream Manager dies, the Stream Manager restarts in the same container, rediscovers the Topology Master 104, and initiates a connection to fetch the physical plan to check if there are any changes in its state. Other Stream Managers 110, who have lost the connection to the failed Stream Manager, also get a copy of the same physical plan indicating the location of the new Stream Manager, and create a connection to the new Stream Manager. When an SPS instance 112 dies within a container, it is restarted, and it contacts its local Stream Manager 110. The SPS instance 112 then gets a copy of the physical plan, identifies whether it is a spout or bolt, and starts executing the corresponding user logic code.

When any container is rescheduled or relocated to a new machine, the newly minted Stream Manager 110 discovers the Topology Master 104, and follows the same sequence of steps of a Stream Manager failure and an SPS instance failure.

The approach described above provides a number of advantages over previous stream processing systems. First, the provisioning of resources (e.g. for containers and even Topology Master 104) is cleanly abstracted from the duties of the cluster manager, thereby allowing stream processing system 10 to "play nice" with the rest of the (shared) infrastructure.

Second, since each SPS Instance 112 executes only a single task (e.g., running a spout or bolt). It is, therefore, easy to debug that instance by simply using tools like jstack and heap dump with that process.

Third, the design makes it transparent as to which component of the topology is failing or slowing down, as the metrics collection is granular, and lets us easily map an issue unambiguously to a specific process in the system.

Fourth, by allowing component-level resource allocation, stream processing system 10 allows a topology writer to specify exactly the resources for each component, thereby avoiding unnecessary over-provisioning.

Fifth, having a Topology Master per topology allows each topology to be managed independently of each other (and other systems in the underlying cluster). In additional, failure of one topology (which can happen as user-defined code often gets run in the bolts) does not impact the other topologies.

Sixth, the backpressure mechanism allows us to achieve a consistent rate of delivering results, and a precise way to reason about the system. It is also a key mechanism that allows migrating topologies from one set of containers to another (e.g., to an upgraded set of machines).

Finally, stream processing system 10 may, in certain examples, not have a single point of failure.

In addition to the functionality described above, in some example approaches, it can be advantageous to include functionality such as: a) the ability for users to interact with their topologies 60, b) the ability for users to view metrics and trends for their topologies, c) the ability for users to view exceptions that occurs in the SPS instances 112, and d) the ability for users to view their topology logs. For that reason, in some example approaches, additional components may be added to stream processing system 10.

Figure 12:
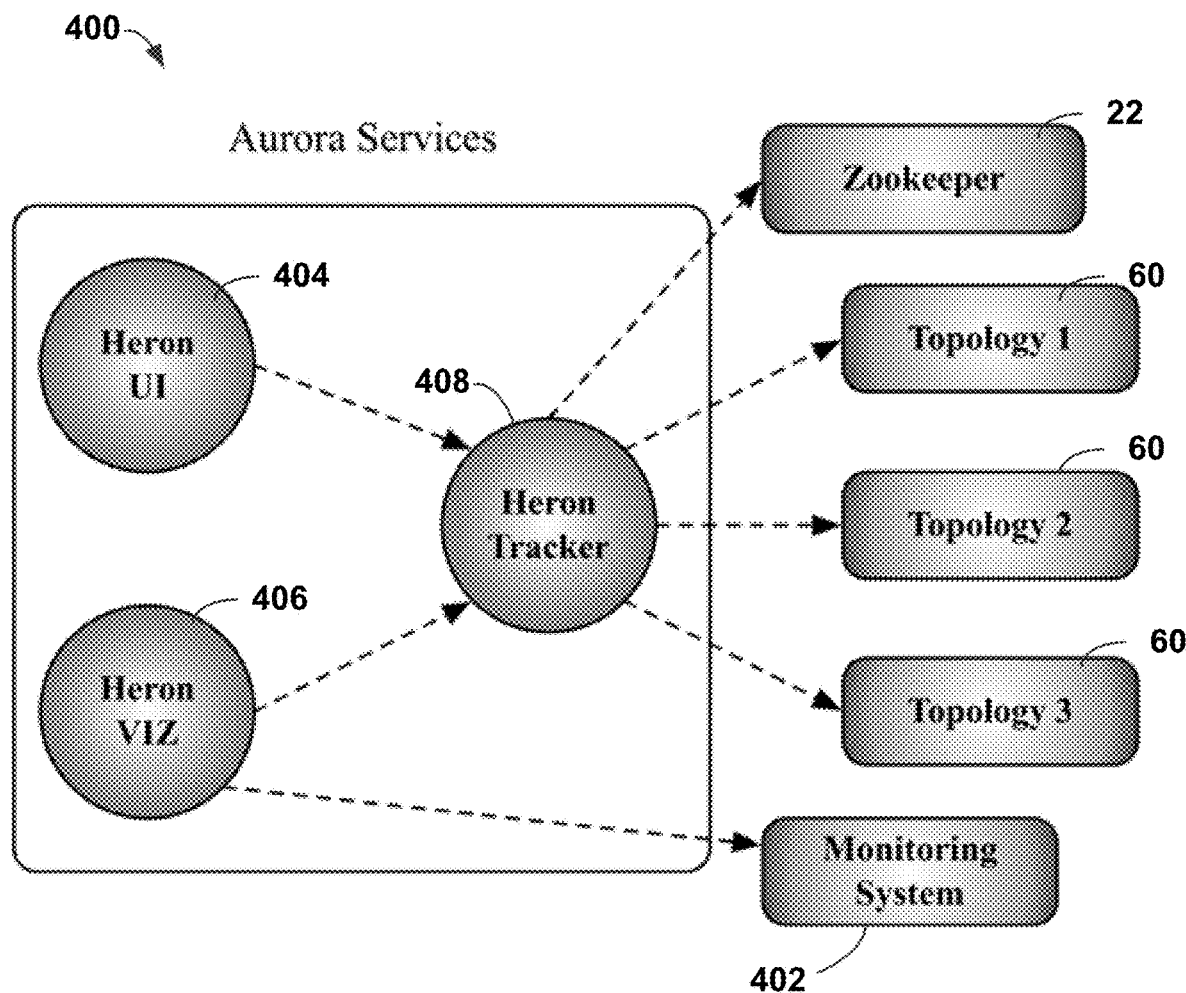
FIG. 12 is a block diagram of an example production stream processing system, in accordance with one or more aspects of the present disclosure.

FIG. 12 is a block diagram of an example production stream processing system, in accordance with one or more aspects of the present disclosure. In the example production stream processing system 400 of FIG. 12, system 400 includes Zookeeper 22, monitoring system 402, one or more topologies 60, a user interface component 404, a dashboard component 406 and a tracker component 408 connected to Zookeeper 22, topologies 60, user interface component 404 and dashboard component 406.

In one example approach, tracker component 408 acts as a gateway to access information about topologies 60. In one such example approach, tracker component 408 interfaces with the same Zookeeper 22 instance that the topologies 60 use to save their metadata, and collects additional information about the topologies 60. In one such approach, tracker component 408 uses Zookeeper 22 to keep track of new topologies 60 that are being launched, to keep track of existing topologies 60 that are being killed, and to track any change in the physical plan of the topology (such as a container being moved from one host to another).

In addition, in some example approaches, tracker component 408 uses the metadata information in Zookeeper 22 to discover where the Topology Master 104 of a topology 60 is running in order to obtain metrics and any other relevant data.

In one example approach, tracker component 408 provides a clean abstraction by exposing a well-defined REST API that makes it easy to create any additional tools. The API provides information about the topologies such as the logical and the physical plan, various metrics including user-defined and system metrics, links to log files for all the instances, and links to the Aurora job pages for the executing containers. In one example approach, tracker component 408 runs as an Aurora service, and, in some such example approaches, is run in several instances for fault tolerance. In some such approaches, API requests are load balanced across the instances of tracker component 408.

In one example approach, system 10 implements a service that creates a dashboard component 406 used to view the metrics collected by the Metrics Manager for each topology. In one example approach, the service periodically contacts the tracker component 408 for any new topology 60. When there is a new topology 60, dashboard component 406 uses the HTTP API of a graphing system (e.g., Viz) to create a dashboard of graphs. In order to create the dashboard, in one example approach, dashboard component 406 retrieves the logical plan of the topology to determine the components, i.e. the bolts and the spouts, and the number of instances of each component. For each component in the topology, a section is created based on the type of the component (spout or bolt), and queries are generated based on the number of instances.

In one example approach, the dashboard generated by dashboard component 406 for each topology is categorized into categories such as health metrics, resource metrics, component metrics and stream manager (SM) metrics. Health metrics include metrics such as the overall lag the topology is experiencing, the aggregate tuple fail count in the spouts, and the number of Stream Manager deaths.

Resource metrics include metrics such as the CPU resources allocated, the CPU resources that are actually used, the amount of memory that is being used, the amount of memory that has been reserved, and the amount of time spent in garbage collection.

Component metrics include, for each spout, the number of tuples that have been emitted, failed, and acknowledged. Component metrics may also include metrics such as the average end-to-end latency for processing a tuple and, for each bolt, the number of tuples executed, acknowledged and emitted, and the average latency for processing each tuple.

Stream Manager metrics include metrics such as the number of tuples that have arrived from instances for each Stream Manager, the number of tuples delivered to the instances, the number of tuples dropped when receiving and sending to instances and other SMs, and the total aggregate time spent in backpressure mode.

Stream processing system 10 has been placed in production and runs hundreds of development and production topologies in multiple data centers. These topologies process several tens of terabytes of data, generating billions of output tuples. Topologies vary in their complexity and a large number of topologies have three or fewer stages. There are several topologies that extend to more than three stages, and the longest ones go as deep as eight stages.

In one example approach, users interact with their topologies 60 using a rich visual user interface (UI) via user interface component 404. In one such example approach, the user interface component 404 uses the Tracker component API to display a visual representation of the topologies, including their logical and physical plans. In one such approach, logical plans display the directed acyclic graph with each node uniquely color-coded.

Figure 13:
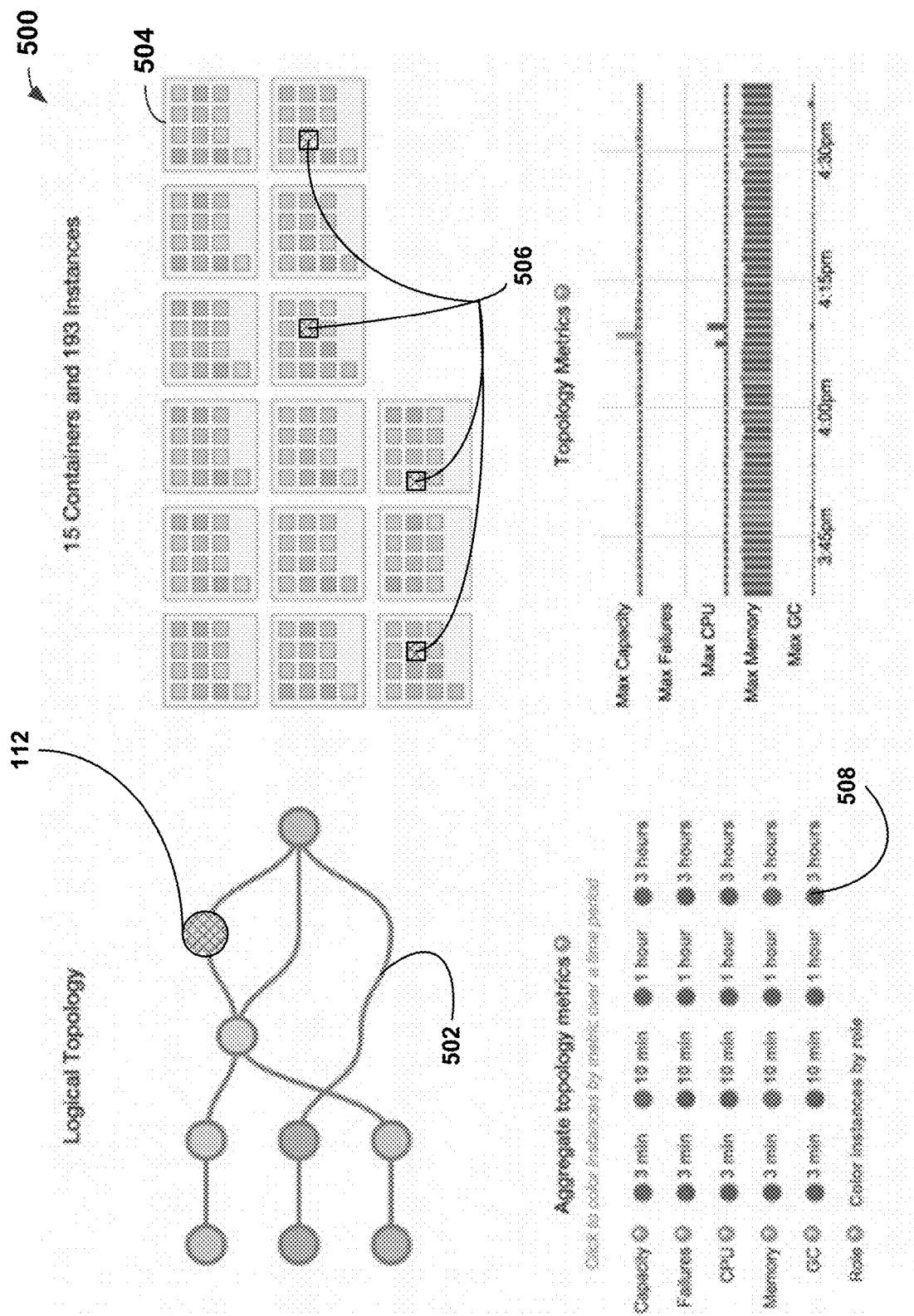
FIG. 13 illustrates an example user interface, in accordance with one or more aspects of the present disclosure.

FIG. 13 illustrates an example user interface, in accordance with one or more aspects of the present disclosure. In the example approach of FIG. 13, user interface 500 displays a topology 60 having nine instances 112 as a directed graph 502. In one such example approach, instances 112 include one or more spouts 120 and one or more bolts 122. In the example approach of IG. 13, topology 60 is shown in container display 504 implemented as 193 instances across 15 containers. Each instance 112 in directed graph 502 has one or more corresponding icons 506 in container graph 504 illustrating the containers that include that instance 112.

In one example approach, system 10 displays within a display an icon 506 for each instance 112. In response to moving a pointer icon under, for instance, mouse control such that it hovers over one of the icons 506, system 10 displays within the display metrics information corresponding to the SPS instance associated with the icon 506. In response to clicking on one of the icons 506, system 10 displays information representing activity within the instance 112 associated with icon 506.

In one example approach, system 10 displays an icon 508 for each of a one or more attributes and for each of a plurality of time periods, wherein each icon is in a first state when the stream processor 12 associated with the topology 60 experiences an anomaly condition during the time period associated with the icon and wherein each icon 508 is in a second state when the stream processor 12 does not experience an anomaly during the time period associated with the icon. In one such approach, a red dot indicates an anomaly condition occurred during the time period associated with the icon 508 while a green dote indicates an anomaly did not occur during the time period associated with the icon 508.

In one example approach, clicking on an icon 506 causes system 10 to display icons 508 with metrics information limited to the instance 112 associated with the icon 506. In one example approach, system 10 displays an icon 508 for each of a one or more attributes of that instance 112 and for each of a plurality of time periods, wherein each icon is in a first state when the instance 112 experiences an anomaly condition during the time period associated with the icon and wherein each icon 508 is in a second state when the instance does not experience an anomaly during the time period associated with the icon. In one such approach, a red dot indicates an anomaly condition occurred during the time period associated with the icon 508 while a green dote indicates an anomaly did not occur during the time period associated with the icon 508.

Figure 14:
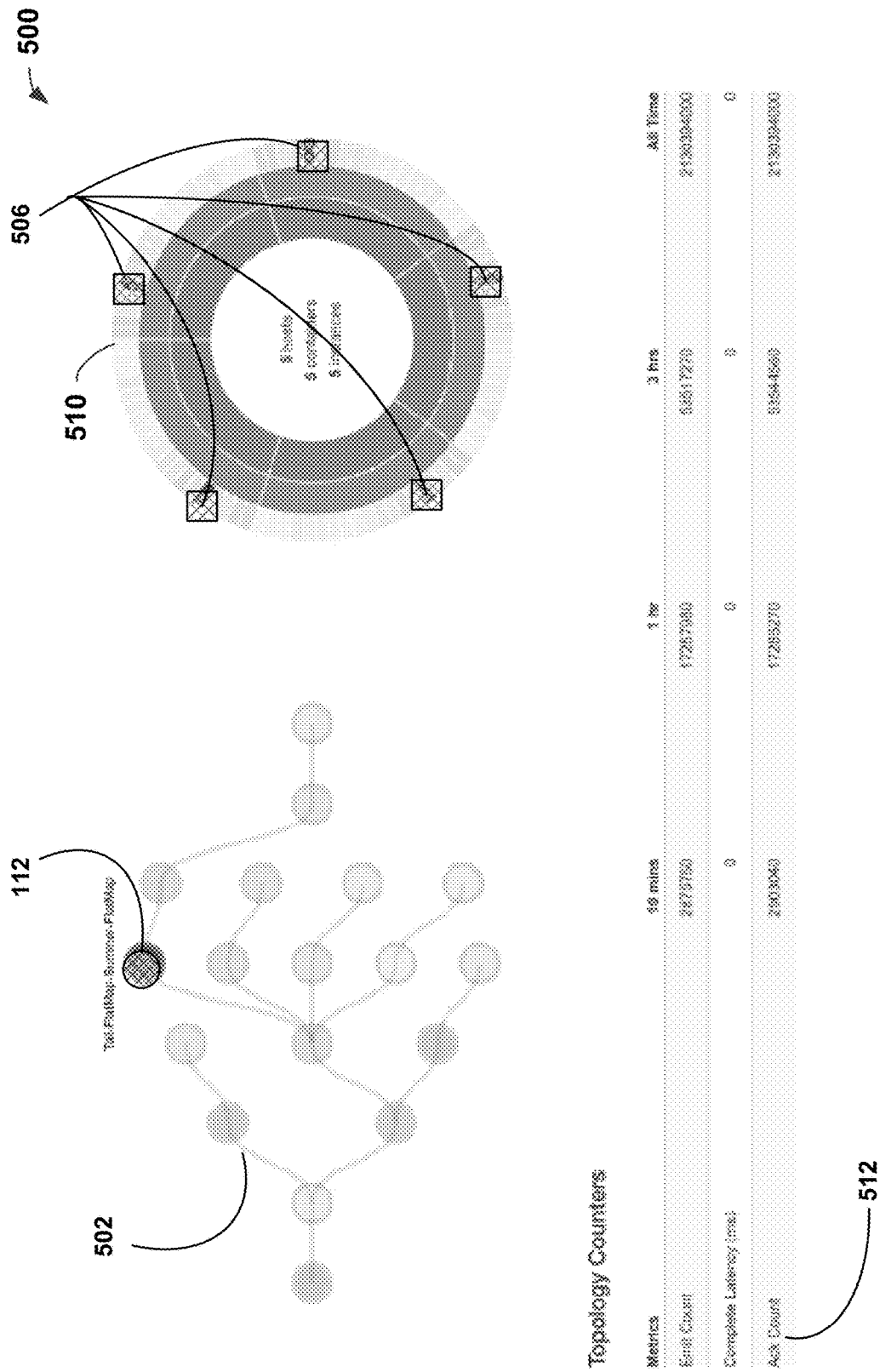
FIG. 14 illustrates another example user interface, in accordance with one or more aspects of the present disclosure.

FIG. 14 illustrates another example user interface, in accordance with one or more aspects of the present disclosure. In one example approach, the physical plan for each topology 60 is displayed as a set of concentric circles within a resource graph 510, with the inner circle representing the hosts, the middle circle depicting the containers, and the outer circle representing the instances of components. System 10 metrics are displayed in metrics area 512. In one example approach, a user can drill down either on a component or on an instance of the component to display metrics limited to that component or instance such as, for example, emit counts, complete/execute latencies, acknowledged counts, and fail counts for the time intervals of last 10 minutes, 1 hour, 3 hours, and since the start of the topology. In one such example approach, user interface 500 also offers easy access links to view the logs and exceptions that are associated with an instance—an important feature for debugging.

The use cases for these topologies are varied and include data transformation, filtering, joining, and aggregating content across various streams (e.g., computing counts). The use cases also include running complex machine learning algorithms (e.g., regression, association and clustering) over streaming data. After migrating all the topologies to stream processing system 400 (from Storm), there was an overall 3× reduction in hardware—a significant improvement in infrastructure efficiency.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting information for display, techniques of the disclosure may output such information in other forms, such as audio, holographical, or haptic forms, to name only a few examples, in accordance with techniques of the disclosure.

Various examples have been described. These and other examples are within the scope of the following claims.

What is claimed is:

1. A stream processing system, comprising:
   a cluster manager;
   a cluster including a plurality of cluster nodes, wherein each cluster node includes computing resources and wherein the cluster nodes are managed by the cluster manager;

a service scheduler, wherein the service scheduler receives resource offers from the cluster manager representing computing resources available on one or more of the cluster nodes and determines resources to accept and computations to run on the accepted resources; and a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts, wherein each spout transfers tuples to one or more bolts and wherein each bolt performs a computation on the transferred tuples, wherein each SPS instance includes a gateway thread and a task execution thread, wherein each gateway thread controls communication and data movement in and out of the respective SPS instance, wherein the task execution thread performs a function on data in a data stream received by the gateway thread to arrive at a solution and transfers the solution through the gateway thread to the stream manager, wherein each thread executes as a task on one or more of the cluster nodes, wherein the gateway thread and the task execution thread use a queue to buffer metrics data transferred from the task execution thread to the gateway thread, and wherein the queue is reviewed periodically to determine if a size of the queue should be increased or decreased.

2. The stream processing system of claim 1, wherein each SPS instance is a Java Virtual Machine (JVM) process executing on one or more of the cluster nodes.

3. The stream processing system of claim 1, wherein the second container further includes a metrics manager, wherein the stream processing system further comprises a monitoring system, and wherein the metrics manager receives metric information from one or more of the SPS instances and transfers the metric information to the monitoring system.

4. The stream processing system of claim 1, wherein the second container further includes a metrics manager, wherein the stream processing system further comprises a monitoring system, and wherein the metrics manager receives metric information from the stream manager and from one or more of the SPS instances and transfers the metric information to the monitoring system.

5. The stream processing system of claim 1, wherein the gateway thread and the task execution thread use a second queue to buffer data transferred from the gateway thread to the task execution thread, and
wherein the second queue is bounded in size.

6. The stream processing system of claim 1, wherein the gateway thread and the task execution thread use a second queue to buffer data transferred from the gateway thread to the task execution thread, and
wherein the second queue is reviewed periodically to determine if a size of the second queue should be increased or decreased.

7. The stream processing system of claim 1,
wherein, when the stream manager in the second container fails, the stream manager is restarted in the second container, the stream manager rediscovers the topology master, and the stream manager retrieves a copy of a physical plan from the topology master.

8. The stream processing system of claim 1,
wherein, when one of the SPS instances in the second container fails, the failed SPS instance is restarted in the second container and the restarted SPS instance contacts the stream manager in the second container, retrieves a copy of a physical plan, and executes user code corresponding to the physical plan.

9. A stream processing system, comprising:
a cluster manager;
a cluster including a plurality of cluster nodes, wherein each cluster node includes computing resources and wherein the cluster nodes are managed by the cluster manager;
a service scheduler, wherein the service scheduler receives resource offers from the cluster manager representing computing resources available on one or more of the cluster nodes and determines resources to accept and computations to run on the accepted resources; and
a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts,
wherein each spout transfers tuples to one or more bolts and wherein each bolt performs a computation on the transferred tuples,
wherein the stream processing system further comprises a distributed coordination service and a standby topology master,
wherein the distributed coordination service stores state information regarding the topology master,
wherein the standby topology master replaces the topology master based on the state information.

10. The stream processing system of claim 9, wherein the second container further includes a metrics manager configured to:
receive metrics information from one or more of the SPS instances; and
transfer the metrics information to a monitoring system.

11. A stream processing system, comprising:
a cluster manager;
a cluster including a plurality of cluster nodes, wherein each cluster node includes computing resources and wherein the cluster nodes are managed by the cluster manager;
a service scheduler, wherein the service scheduler receives resource offers from the cluster manager representing computing resources available on one or more of the cluster nodes and determines resources to accept and computations to run on the accepted resources; and
a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts, wherein each spout transfers tuples to one or more bolts and wherein each bolt performs a computation on the transferred tuples, wherein the stream processing system further comprises a distributed coordination service and a standby topology master, wherein the distributed coordination service stores state information regarding the topology master, wherein, when the topology master fails, the standby topology master replaces the topology master based on the state information, the first container restarts and wherein the topology master in the first container becomes a standby topology master.

12. The stream processing system of claim 11, wherein the second container further includes a metrics manager configured to:

receive metrics information from the stream manager and from one or more of the SPS instances; and transfer the metrics information to a monitoring system.

13. A stream processing system, comprising:

a cluster manager;

a cluster including a plurality of cluster nodes, wherein each cluster node includes computing resources and wherein the cluster nodes are managed by the cluster manager;

a service scheduler, wherein the service scheduler receives resource offers from the cluster manager representing computing resources available on one or more of the cluster nodes and determines resources to accept and computations to run on the accepted resources; and a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts, wherein each spout transfers tuples to one or more bolts and wherein each bolt performs a computation on the transferred tuples, wherein, when the stream manager in the second container fails, the stream manager is restarted in the second container, the stream manager rediscovers the topology master, and the stream manager retrieves a copy of a physical plan from the topology master.

14. The stream processing system of claim 13, wherein each SPS instance includes a gateway thread and a task execution thread, wherein executing each SPS instance includes executing each thread as a task on one or more of the cluster nodes.

15. A stream processing system, comprising:

a cluster manager;

a cluster including a plurality of cluster nodes, wherein each cluster node includes computing resources and wherein the cluster nodes are managed by the cluster manager;

a service scheduler, wherein the service scheduler receives resource offers from the cluster manager representing computing resources available on one or more of the cluster nodes and determines resources to accept and computations to run on the accepted resources; and a stream processor, wherein the stream processor includes one or more jobs, wherein each job includes two or more containers, including a first container and a second container, the first container including a topology master and the second container including a stream manager and one or more stream processing system (SPS) instances, wherein each SPS instance executes, on one or more of the cluster nodes, one or more tasks from a group of tasks associated with spouts and bolts, wherein each spout transfers tuples to one or more bolts and wherein each bolt performs a computation on the transferred tuples, wherein, when one of the SPS instances in the second container fails, the failed SPS instance is restarted in the second container and the restarted SPS instance contacts the stream manager in the second container, retrieves a copy of a physical plan, and executes user code corresponding to the physical plan.

16. The stream processing system of claim 15, further comprising a distributed coordination service to store state information regarding the topology master, wherein when the topology master fails, a standby topology master replaces the topology master based on the state information.

\* \* \* \* \*